United States Patent
Qi et al.

(10) Patent No.: US 9,799,126 B2
(45) Date of Patent: Oct. 24, 2017

(54) APPARATUS AND METHOD FOR ROBUST NON-LOCAL MEANS FILTERING OF TOMOGRAPHIC IMAGES

(71) Applicant: TOSHIBA MEDICAL SYSTEMS CORPORATION, Otawara-shi (JP)

(72) Inventors: Wenyuan Qi, Vernon Hills, IL (US); Xiaofeng Niu, Mundelein, IL (US); Evren Asma, Buffalo Grove, IL (US); Wenli Wang, Briarcliff Manor, NY (US); Ting Xia, Mundelein, IL (US)

(73) Assignee: Toshiba Medical Systems Corporation, Otawara-shi (JP)

( * ) Notice: Subject to any disclaimer, the term of this patent is extended or adjusted under 35 U.S.C. 154(b) by 91 days.

(21) Appl. No.: 14/873,768

(22) Filed: Oct. 2, 2015

(65) Prior Publication Data
US 2017/0098317 A1   Apr. 6, 2017

(51) Int. Cl.
*G06T 11/00* (2006.01)
*G06T 5/00* (2006.01)
(Continued)

(52) U.S. Cl.
CPC .............. *G06T 11/008* (2013.01); *G06K 9/34* (2013.01); *G06K 9/6215* (2013.01); *G06T 5/002* (2013.01);
(Continued)

(58) Field of Classification Search
None
See application file for complete search history.

(56) References Cited

U.S. PATENT DOCUMENTS

| 6,195,459 B1* | 2/2001 | Zhu ..................... G06K 9/00456 382/155 |
| 2009/0136154 A1* | 5/2009 | Bocko ................... G06F 17/147 382/280 |

(Continued)

OTHER PUBLICATIONS

Coupé et al. "3D Wavelet Subbands Mixing for Image Denoising," International Journal of Biomedical Imaging, vol. 2008, Article ID 590183.*

(Continued)

*Primary Examiner* — Matthew Bella
*Assistant Examiner* — Soo Shin
(74) *Attorney, Agent, or Firm* — Oblon, McClelland, Maier & Neustadt, L.L.P.

(57) ABSTRACT

An apparatus for performing a non-local means (NLM) filter is described. The pixel of the NLM-filtered image are weighted averages of pixels from a noisy image, where the weights are a measure of the similarity between patches of the noisy image. The similarity weights can be calculated using a Kullback-Leibler or a Euclidean distance measure. The similarity weights can be based on filtered patches of the noisy image. The similarity weights can be based on a similarity measure between patches of an anatomical image corresponding to the noisy image. The similarity weights can be calculated using a time series of noisy images to increase the statistical sample size of the patches. The similarity weights can be calculated using a weighted sum of channel similarity weights calculated between patches of noisy image that have been band-pass filtered. The NLM-filtered image can also be blended with a non-NLM-filtered image.

20 Claims, 13 Drawing Sheets

(51) Int. Cl.
G06T 5/10 (2006.01)
G06K 9/34 (2006.01)
G06K 9/62 (2006.01)

(52) U.S. Cl.
CPC ...... *G06T 5/10* (2013.01); *G06T 2207/10104* (2013.01); *G06T 2207/20221* (2013.01)

(56) References Cited

U.S. PATENT DOCUMENTS

2010/0020208 A1* 1/2010 Barbu .................. G06K 9/40 348/250
2013/0216117 A1* 8/2013 Mercuriev .............. G06T 5/002 382/132

OTHER PUBLICATIONS

Dabov et al. "Image Denoising by Sparse 3-D Transform-Domain Collaborative Filtering," IEEE Transactions on Image Processing, vol. 16, No. 8, Aug. 2007.*

Dutta et al. "Non-Local Means Denoising of Dynamic PET Images," PLOS One, Dec. 5, 2013.*

Andre A. Bindilatti, et al., "Nonlocal Approaches for Poisson Noise Removal," 2015.

Alexander Wong, et al., "Homotopic Non-Local Regularized Reconstruction From Sparse Positron Emission Tomography Measurements," BMC Med Imaging 15.1, 2015 http://www.ncbi.nlm.nih.gov/pmc/articles/PMC4379748/.

Zachary S. Kelm, et al., "Optimizing Non-Local Means for Denoising Low Dose CT," Biomedical Imaging: From Nano to Macro, 2009, ISBI'09, IEEE International Symposium on. IEEE, 2009, Abstract http://dl.acm.orq/citation.cfm?id=1700039.

Buades, A., et al., "Image Denoising Methods. A New Nonlocal Principle", Society for Industrial and Applied Mathematics, vol. 52, No. 1, pp. 113-147, (2010).

Chun, S. Y., et al., "Post-Reconstruction Non-Local Means Filtering Methods using CT Side Information for Quantitative Spect", Physics in Medicine and Biology, vol. 58, No. 17, pp. 1-24, (Sep. 7, 2013).

Deledalle, C., et al., "Poisson NL means: Unsupervised Non Local Means for Poisson Noise", Proceedings of 2010 IEEE 17th International Conference on Image Processing, pp. 801-804, (Sep. 26-29, 2010).

Chan, C., et al., "A Non-Local Post-filtering Algorithm for PET Incorporating Anatomical Knowledge", Nuclear Science Symposium Conference Record, pp. 2728-2732, (2009).

Chan, C., et al., "Postreconstuction Nonlocal Means Filtering of Whole-Body PET with an Anatomical Prior", IEEE Transactions on Medical Imaging, vol. 33, No. 3, pp. 636-650, (Mar. 2014).

Dabov, K., et al., "Image Denoising by Sparse 3-D Transform-Domain Collaborative Filtering", IEEE Transactions on Image Processing, vol. 16, No. 8, pp. 2080-2095, (Aug. 2007).

Coupe, P., et al., "3D Wavelet Subbands Mixing for Image Denoising", International Journal of Biomedical Imaging, vol. 2008, No. 3, pp. 1-11, (2008).

Lukin, A., "A Multiresolution Approach for Improving Quality of Image Denoising Algorithms", ICASSP, pp. 857-860, (2006).

Dutta, J., et al., "Non-Local Means Denoising of Dynamic PET Images", PLoS One, vol. 8, Issue 12, pp. 1-15, (Dec. 2013).

* cited by examiner

APPARATUS AND METHOD FOR ROBUST NON-LOCAL MEANS FILTERING OF TOMOGRAPHIC IMAGES

FIELD

Embodiments disclosed herein relate generally to non-local means filtering of noisy images, and, more particularly, to non-local means filtering of noisy tomographic images (e.g., positron emission tomography (PET) images at low dosage rates and/or fast time resolution).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The use of positron emission tomography is growing in the field of medical imaging. In positron emission tomography (PET) imaging, a radiopharmaceutical agent is introduced into the object to be imaged via injection, inhalation, or ingestion. After administration of the radiopharmaceutical, the physical and bio-molecular properties of the agent cause it to concentrate at specific locations in the human body. The actual spatial distribution of the agent, the intensity of the region of accumulation of the agent, and the kinetics of the process from administration to its eventual elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are combined. Most of the time, an annihilation event produces two gamma rays (at 511 keV) traveling at substantially 180 degrees apart.

In order to be able to reconstruct the spatio-temporal distribution of the radio-isotope via tomographic reconstruction principles, each detected event will need to be characterized for its energy (i.e., amount of light generated), its location, and its timing. By detecting the two gamma rays, and drawing a line between their locations, i.e., the line-of-response (LOR), one can determine the likely location of the original disintegration. While this process will only identify a line of possible interaction, by accumulating a large number of those lines, and through a tomographic reconstruction process, the original distribution can be estimated. In addition to the location of the two scintillation events, if accurate timing (within a few hundred picoseconds) is available, a time-of-flight (TOF) calculation can add more information regarding the likely position of the event along the line. Limitations in the timing resolution of the scanner will determine the accuracy of the positioning along this line. The collection of a large number of events creates the necessary information for an image of an object to be estimated through tomographic reconstruction.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. Most modern PET scanners are composed of several thousand individual crystals (i.e., scintillator elements), which are arranged in two-dimensional scintillator arrays that are packaged in modules with photodetectors to measure the light pulses from respective scintillation events. The relative pulse energy measured by the photodetectors is used to identify the position of the scintillation event. Typically scintillator elements have a cross section of roughly 4 mm×4 mm. Smaller or larger dimensions and non-square sections are also possible. The length or depth of the crystal will determine how likely the gamma ray will be captured, and typically ranges from 10 to 30 mm. One example of a scintillation crystal is LYSO (or $Lu_{1.8}Y_{0.2}SiO_5$:Ce or Lutetium Orthosilicate), which is chosen for its high light output, fast rise time, fast decay time, high average atomic number, and high density. Other crystals can be used.

Using Anger logic and crystal decoding, the source of each scintillation event can be identified as originating from a particular scintillator. A scintillation event will generate light initially radiating isotropically. The spatial distribution of this light may be modified by interactions with scintillator surfaces and reflectors before being detected by the four nearest photodetectors. From the relative pulse energy measured by each of these four photodetectors, the position of the scintillation event relative to the four photodetectors can be determined. The formulas for deriving position information from the relative pulse energies of the photodetectors are referred to as Anger arithmetic. These positions can be further refined by generating a lookup table from a floodmap in order to assign each scintillator event to a scintillator element using the lookup table. This process of mapping from the x- and y-positions obtained using Anger arithmetic to discrete scintillator elements is referred to as crystal decoding.

Often clinical PET data/images use only a relatively small number of gamma ray photons resulting from the use of fast-decay isotope and short scan times. Thus, the PET reconstructed images from these limited data sets appear noisy when the routine iterative reconstruction algorithms are applied. As a result, regularization, in-iteration and/or post filter smoothing methods are commonly used on the PET reconstruction images to improve image quality before a diagnosis. Improved and robust methods of reducing noise in PET images are desired.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1:
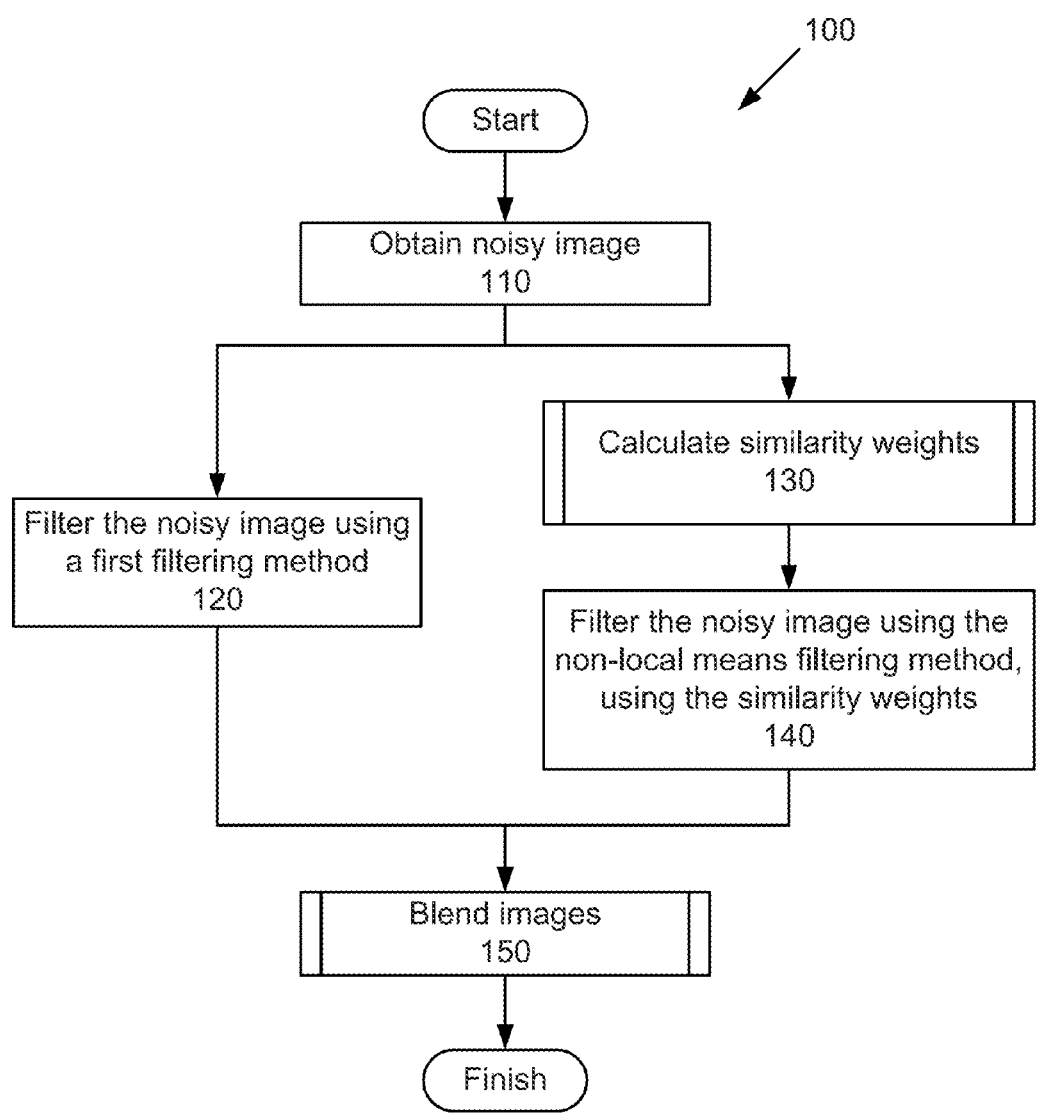
FIG. 1 shows a flow diagram of a method of performing non-local means (NLM) filtering, according to one implementation.

Many tomographic applications can result in the generation of noisy images. The reasons why an image is noisy might vary depending on the application. For example, some images can have a poorer signal-to-noise ratio due to a desire to minimize radiation dosage, whereas other images can be noisy due to efforts to decrease the time resolution. Still other tomographic images can be noisy due to the methods used to reconstruct the images. For example, statistical image reconstruction methods, such as the unregularized ordered-subset expectation maximization (OSEM) algorithm, which are used in many clinical SPECT imagers, can be ill-posed, resulting in noisy images when many iterations of the algorithm are used. Additionally, time resolved positron emission tomography (PET), i.e., dynamic PET, can be used to reveal information about radiotracer kinetics in addition to the spatial distribution. Unlike static PET, where the coincidence events are summed up over the entire scan duration and a three-dimensional (3D) spatial image is generated, dynamic PET yields a four-dimensional (4D) spatiotemporal map of tracer distribution by binning these events over multiple time frames of shorter durations. The shorter time durations corresponding to thin time slices of the spatiotemporal map also correspond to fewer counts and correspondingly noisier images.

Regardless of the reason for the noisier images, reducing image noise to improve clinical diagnosis is a common problem in the field of tomographic imaging. Not all methods produce robust results of denoising these images. The methods described herein achieve robust denoising of tomographic images, especially PET images, by using a robust implementation of non-local means filtering.

Many methods of noise filtering can be applied to noisy images, including: linear smoothing filters, anisotropic diffusion, non-local means, and nonlinear filters.

Linear smoothing filters remove noise by convolving the original image with a mask that represents a low-pass filter or smoothing operation. For example, the Gaussian mask comprises elements determined by a Gaussian function. This convolution brings the value of each pixel into closer agreement with the values of its neighbors. In general, a smoothing filter sets each pixel to the average value, or a weighted average, of itself and its nearby neighbors; the Gaussian filter is just one possible set of weights. Disadvantageously, smoothing filters tend to blur an image because pixel intensity values that are significantly higher or lower than the surrounding neighborhood are smeared or averaged across their neighboring area. Sharp boundaries become fuzzy. Generally, local linear filter methods assume the homogeneity could be found in the local neighbourhood are homogeneous and therefore tend to impose homogeneity on the image obscuring non-homogeneous features, such as lesions or organ boundaries.

Anisotropic diffusion removes noise while preserving sharp edges by evolving an image under a smoothing partial differential equation similar to the heat equation. If the diffusion coefficient were a spatially constant, this smoothing would be equivalent to linear Gaussian filtering, but when the diffusion coefficient is anisotropic according to the presence of edges, the noise can be removed without blurring the edges of the image.

A median filter is an example of a non-linear filter and, if properly designed, a nonlinear filter can also preserve edges and avoid blurring. A median filter operates, for example, by evaluating each pixel in the image, sorting the neighboring pixels according to intensity, and replacing the original value of the pixel with the median value from the ordered list of intensities. The median filter is one example of a rank-conditioned rank-selection (RCRS) filter. For example, Median filters and other RCRS filters can be applied to remove salt and pepper noise from an image without introducing significant blurring artifacts. In addition to filtering, various regularization methods can be used in conjunction with the image reconstruction algorithm. For example, a total-variation (TV) minimization regularization term can be used where it is assumed that the areas being imaged are uniform over discrete areas with relatively sharp boundaries between the areas. A TV filter can also be used as another example of a non-linear filter.

In non-local means filtering, rather than performing a weighted average of pixels according to their spatial proximity, pixels are determined to be a weighted average according to the similarity between patches within the images. Thus, noise is removed based on non-local averaging of all the pixels in an image—not just the neighboring pixels. In particular, the amount of weighting for a pixel is based on the degree of similarity between a small patch centered around that pixel and another small patch centered around the pixel being de-noised. The word "pixel" used herein is interpreted broadly to include both two-dimensional pixels and three-dimensional volume pixels (i.e., voxels).

The methods described herein generally emphasize improved implementations of non-local filtering, but can also apply the other filtering types discussed above in conjunction with non-local filtering. In tomographic clinical images, non-local means (NLM) filtering advantageously suppresses noise while preserving organ boundaries. NLM filters can be particularly effective at filtering noise found in the constant regions and background.

Disadvantageously, conventional implementations of NLM filtering can be highly dependent on multiple parameters, and the parameters might not be robust across different patients, or might not be robust across different organs within the same patient. These parameters can include the size of the image patches (e.g., the number of rows and columns) being compared and the smoothing strength parameter h. Generally, an NLM filter is based on the weighted average of nonlocal pixels, depending on the patches similarity. In some NLM implementations, the similarity measurement is inaccurate when applied to PET images due to the high noise level in the PET images. Further, the smoothing strength parameter h might not be robust to different intensity levels. For example, PET images have large intensity ranges, and different organs within a given image can also vary significantly in intensity, making the absence of robustness to intensity level especially problematic for PET. Moreover, in conventional NLM filtering, which uses the Euclidean distance measure, the lack of robustness to the intensity level is exacerbated by the combination of a constant smoothing strength Euclidean distance measure because applying a constant smoothing strength has different smoothing effects in different intensity range due to the Euclidean distance measure. Thus, this uneven filtering resulting from the application of the Euclidean distance measure can make finding a global effective smoothing-strength parameter h difficult. Finally, some implementations of NLM filtering create artifacts, such as artificial texture, in the filtered image. These obstacles can be overcome using the improved NLM filtering methods described herein.

For example, the methods described herein can improve upon previous implementations of NLM filtering in several ways. First, the methods described herein are robust to the image noise by basing the similarity measurements on image patches that have been filtered in a transform domain. Second, the similarity measures described herein, according to certain implementations, have been improved by using a channelized patch comparison. Third, when a series of images is generated as a function of time (e.g., in the dynamic PET method discussed above) the similarity weights used in the NLM filtering can be improved by using images from multiple time frames in order to perform the weighted averaging in the NLM filter. Fourth, distance measures other than the Euclidean distance measure can be used. In particular, these other distance measures, such as the Kullback-Leibler (KL) distance measure, can be chosen because they are more robust than Euclidean distance measures to variations in the average pixel values of the patches (i.e., the intensity of the respective patches). Fifth, certain implementation of the methods described herein can use anatomical images and organ contour definitions to achieve better similarity weights between patches. These anatomical images can be used in certain implementation to create mixed similarity weights representing both the similarity between patches of the anatomical image and the similarity between patches of the noisy PET image. In certain implementations, the anatomical images can be used to refine similarity weights calculated using only the noisy PET image. Sixth, many of the filtering methods described herein can be combined or performed in series to achieve additional improvements relative to performing each filtering method separately.

While the discussion herein expressly describes the application of image filtering of PET reconstructed images, other images, in addition to PET reconstructed images, can be filtered using the methods described herein, as would be understood by one of ordinary skill in the art. For example, noisy tomography images, such as those obtained using SPECT, X-ray computed tomography (CT), and magnetic resonance imaging (MRI) can also benefit from being denoised using the methods described herein. Additionally, non-tomographic images, such as fluoroscopic and photographic images for example, can also be filtered and denoised using many of the methods described herein.

The methods described herein can include performing non-local means filtering on a noisy image to reduce noise by calculating similarity weights between patches using a KL distance measure, for example. Also, the methods described herein can include using a time series of images. When the noisy image (i.e., the image being filtered using the NLM filter) is one of a time series of images, the similarity weights can be calculated between patches from the noisy image and patches from images of the times series that are in close temporal proximity to the noisy image. This is in addition to calculating similarity weights between patches of the noisy image. Thus, the sample size of patches used in the weighted sum of the NLM filter can be increased, improving the statistical averaging and noise suppression. In this manner, the temporal window of the NLM filter is expanded from the time interval of the noisy image to include images/frames from neighboring time gates, such that all of the images from the expanded temporal window of the NLM filter contribute to the similarity weights are used to calculate the resultant NLM-filtered image.

Further, the methods described herein can include using complementary information from an anatomical image representing the same object OBJ represented in the noisy image, to improve the weighted average performed by the NLM filter. For example, the anatomical image can be used together with the noisy image in an integrated method to calculate mixed similarity weights.

Additionally, anatomical images can be used in series to refine the similarity weights after the similarity weights have already been calculated, in contrast to or in addition to using the anatomical images in the integrated process of calculating the similarity weights. This series process of first calculating the similarity weights and then refining the similarity weights using the anatomical images can be performed, for example, by multiplying the similarity weights by a multiplier that is a function of the similarity between patches of the anatomical images. For example, the anatomical image can be sub-divided into patches with a one-to-one correspondence to the noisy image patches used to calculate the similarity weights. Then for each similarity weight, the anatomical image multiplier can be a function of a similarity measure between patches of anatomical image corresponding to the noisy image patches used to calculate the similarity weight. Thus, the anatomical image multiplier will be larger when the similarity between patches of the anatomical image is greater (e.g., the multiplier can be a monotonic function of the similarity between patches of the anatomical image).

The methods described herein also can include calculating the similarity weights of the NLM filter by first filtering the noisy image and then calculating the similarity weights between patches of the filtered PET image. For example, the first filtering the noisy image can be performed by a low-pass filter. Alternatively, the first filtering of the noisy image can be performed by transforming the images into a transform domain (e.g., using a fast Fourier transform (FFT) or a discrete cosine transform (DCT)), and then the transform-domain coefficients are compared to a threshold and set to zero when the transform-domain coefficients are less than the threshold. Finally, the thresholded transform-domain coefficients are transformed back into the spatial domain using an inverse transformation.

Additionally, the methods described herein can also include calculating the similarity weights by first channeling the noisy image into a series of frequency bands (e.g., one image corresponding to a respective band-pass filter having a unique range of spatial frequencies). Each band-pass filtered image and corresponding spatial frequency band is referred to as a channel. Channelized similarity weights for each channel can be calculated between patches within the respective channel. The total similarity weight for a pair of patches can be calculated by combining the channelized similarity weights for the respective pair of patches, using a weighted average that increases the contributions from channels providing a better indication of the similarity between patches (e.g., channels that empirically correlate more strongly with known similar patches in test images/data).

In certain implementations, the methods described herein can also include that the noisy image is filtered using a local filtering method in parallel with the NLM filtering of the image. Then the local-filtered image and the NLM-filtered image can be blended to create a hybrid of the NLM-filtered image and local filtered image. For example, in addition to calculating the NLM-filtered image, the local-filtered image can be generated using one of a local linear filter (e.g., a Gaussian filter or a Butterworth filter), a local nonlinear filter (e.g., a median filter, an anisotropic edge preserving filter, or a total-variation minimization filter) and a regularization method (e.g., total variation (TV) minimization regularization). Next, the local-filtered image can be blended with the non-local means filtered image by performing wavelet transformations on both the NLM and local filtered images, and blending the low-frequency wavelet coefficients from NLM-filtered image with the low-frequency wavelet coefficients from the second filtered image to generate low-frequency blended wavelet coefficients. The low-frequency blended wavelet coefficients can then be concatenated with the high-frequency wavelet coefficients from the NLM-filtered image, to generate combined wavelet coefficients. Next, the combined wavelet coefficients can be transformed back into the spatial image domain by performing an inverse wavelet transformation on the combined wavelet coefficients to generate a blended filtered image.

Referring now to the drawings, wherein like reference numerals designate identical or corresponding parts throughout the several views, FIG. 1 shows a flow chart of a method 100 of denoising a noisy PET image. In step 110 of the method 100, the noisy image is obtained. For example, the noisy image can be obtained by acquiring, using a PET scanner, detection data representing timing and location information corresponding to gamma-ray detection events occurring at a series of gamma-ray detectors (GRDs), and a reconstructed image can be reconstructed by processing the acquired detection data to generate a PET image. When this PET image is "noisy" (e.g., the image can be improved by filtering out noise) the PET image can be designated as the "noisy image" that is filtered using an NLM filtering method. "Noisy image" is the nomenclature used herein to designate the image to be filtered, rather than a characterization of the image itself. When the NLM filtering method is applied to a PET image, it is understood that the PET image is the noisy image.

In one implementation, rather than measuring the detection data, the detection data will have been acquired previously (e.g., by measuring or simulating the detection data), and the detection data will have been stored in a computer-readable memory. When the detection data has been stored in a memory, then step 110 can be performed by reading the detection data from the memory and reconstructing the PET image from the detection data. In one implementation, the PET image will have been generated previously and stored in memory, and step 110 is performed by reading the PET image from the computer-readable memory.

In certain implementations, the noisy image to be filtered using NLM filtering methods can be any type of image, in addition to a PET image, that would benefit from filtering. Further, the noisy image can be a two-dimensional image or a three-dimensional image. Herein, we refer to the discrete units of the images as pixels, but they can also be voxels of a three-dimensional image, as would be understood by one of ordinary skill in the art. Moreover, the noisy image can be a series of images, such as a time series, as in dynamic PET.

After step 110, the noisy image is directed along two paths, one path beginning with step 120 and the other path beginning with process 130. In each of these two paths, a unique filtering process is begun. The path corresponding to step 120 performs non-NLM filtering on the noisy image, whereas the path corresponding to process 130 performs NLM filtering on the noisy image. In certain implementations, step 120 is optional and can be omitted. In step 120, the noisy image is filtered using a non-NLM filtering method. For example, the noisy image can be filtered using one of a local linear filter (e.g., a Gaussian filter or a Butterworth filter) and a local nonlinear filter (e.g., a median filter, an anisotropic edge preserving filter, or a total-variation minimization filter).

In process 130, the similarity weights for patches of the noisy image are calculated. For example, in one implementation, the similarity weights w(i,j) are given by $$w(i,j) = \exp(-\text{Dist}(u(\aleph_i), u(\aleph_j))/h^2),$$

wherein the distance measure Dist $(u(\aleph_i), u(\aleph_j))$ is a measure of the distance between the image patch designated by $u(\aleph_i)$ and the image patch designated by $u(\aleph_j)$, $\aleph_j$ denotes the neighborhood of pixel j, and h is a smoothing-strength parameter. In one implementation, the distance measure is a Gaussian weighted Euclidean distance, which is given by $$\text{Dist}(u(\aleph_i), u(\aleph_j)) = \|u(\aleph_i) - u(\aleph_j)\|_{2,\alpha}^2, \text{ and}$$

the Gaussian weighted Euclidean distance is calculated as $$\|A - B\|_{2,\alpha}^2 = \sum_{i=1}^{K} \sum_{j=1}^{K} G(i,j)(A(i,j) - B(i,j))^2,$$

wherein G(i,j) is a 2D Gaussian kernel with the variance of α.

In one implementation, the Kullback-Leibler (KL) distance measure is used rather than the Euclidean distance measure as the distance measure between the patches. Using the KL distance measure, the similarity weights are given by $$w(i, j) = \exp\left(-\frac{\|KL(u(\aleph_i), u(\aleph_j))\|_\alpha}{h^2}\right),$$

wherein h is the smoothing-strength parameter and the Gaussian weighted KL distance measure $\|KL(u(\aleph_i), u(\aleph_j))\|_\alpha$ is calculated according to $$\|KL(A, B)\|_\alpha = \sum_{i=1}^{K} \sum_{j=1}^{K} G(i, j)(A(i, j) - B(i, j)) \log\left(\frac{A(i, j)}{B(i, j)}\right),$$

wherein G(i,j) is a 2D Gaussian kernel with a variance of α.

In process 140, which is performed after process 130, the similarity weights are used to perform a weighted average of the pixels of the noisy image to generate the NLM-filtered image. In one implementation, the NLM filter is performed by a weighted average of the pixel values u(j) from the noisy image. The weighted average is given by $$NL(u)(i) = \sum_{j \in \Omega i} \frac{w(i,j)}{y(i)} u(j),$$

wherein u(j) is the $j^{th}$ pixel value, w(i,j) are the similarity weights, and a normalization factor y(i) is given by $$y(i) = \sum_{j' \in \Omega i} w(i,j).$$

When step 120 in not omitted, then process 150 is performed to blend the non-NLM-filtered image with the NLM-filtered image.

Figure 2:
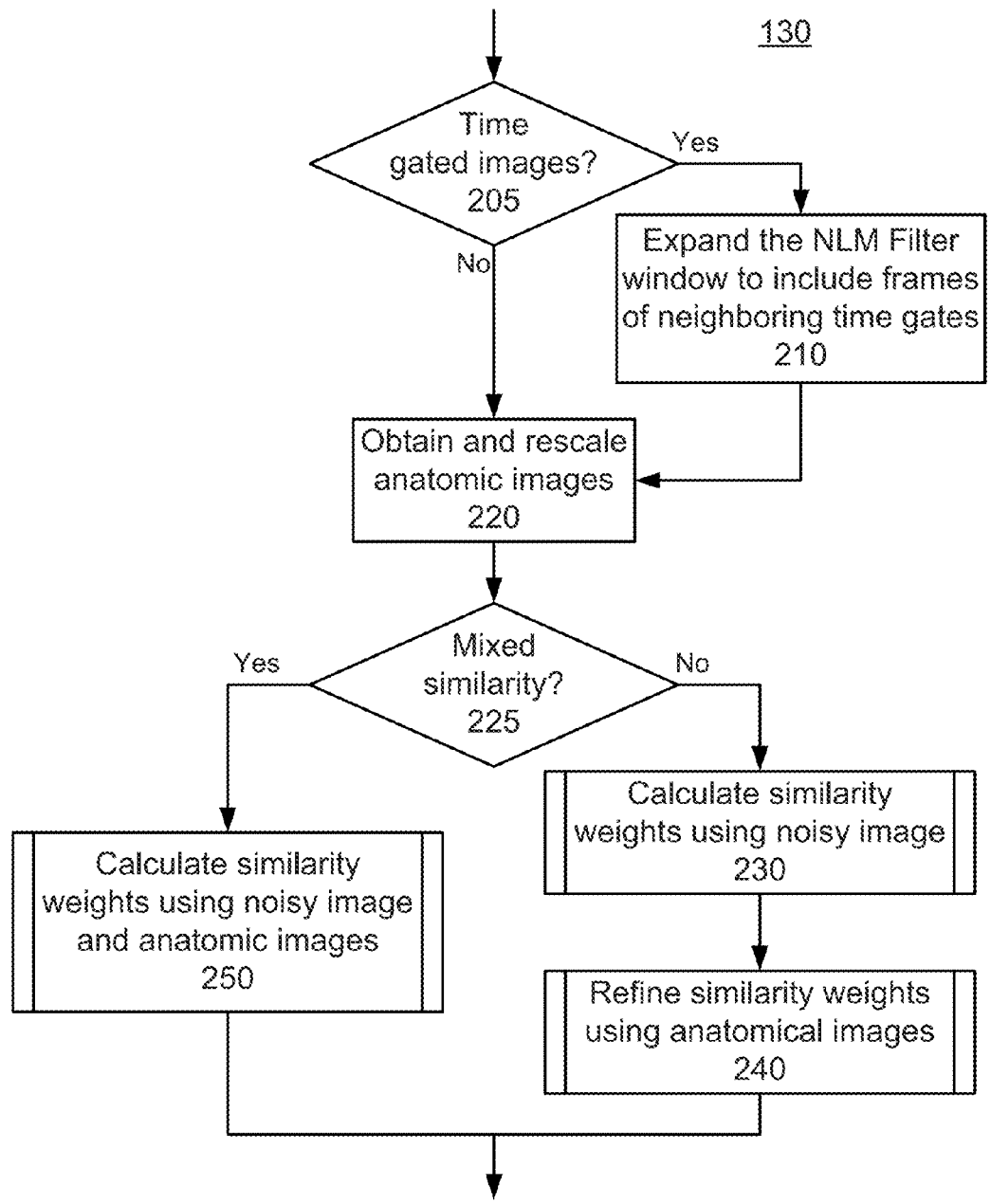
FIG. 2 shows a flow diagram of a process of calculating similarity weights for NLM filtering, according to one implementation.

FIG. 2 shows a flow diagram of process 130. In the first step 205, the process 130 performs an inquiry into whether the noisy image is part of a time series of images; that is whether the noisy image is a time-gated image (e.g., as in dynamic PET having multiple images, image each corresponds to a short time interval such that changes between images in the time series indicate changes in the imaged object OBJ as a function of time). If the noisy image is part of a time series, then process 130 proceeds from step 205 to step 210 and then to step 220. Otherwise, process 130 proceeds directly from step 205 to step 220.

In step 210, the limitations on which patches can be used to calculate similarity weights is expanded from patches taken from the noisy image only to include patches from images within the time series that are time adjacent (e.g., in close temporal proximity) to the noisy image. For example, the time-adjacent images can include the image taken immediately prior to and immediately following the noisy image. Alternatively, the time-adjacent images can include multiple images temporally prior to and following the noisy image. When multiple images before and after the noisy image are used for similarity weights and for NLM filtering, those images in closer time proximity can be weighted more heavily. For example, the similarity weights can be multiplied by a multiplier that is inversely proportional to the time difference between the time-adjacent image and the noisy image.

In one implementation, a second type of image of the object OBJ is used to improve the similarity weights. This second type of image can be referred to as an anatomical image. For example, the anatomical image can include complementary information to the noisy image (e.g., an MRI image would have complementary information to a PET image). The noisy image and the anatomical image can have redundant information, and each type of image can have unique information not included in the other type of image. For a noisy PET image, a X-ray CT image, or an MRI image can be the second type of image (i.e., the anatomical image). In certain implementations, this second type of image is referred to as an anatomical image because the anatomical image conveys anatomical information that is complementary to the noisy PET image.

In certain implementations, the anatomical image can be used to improve the similarity weights by calculating the similarity weights at least partially based on patches of the anatomical image and partially based on patches of the noisy image. In this case the similarity weights can be referred to as mixed-similarity weights because the similarity weights are calculated using a mixture of noisy-image patches and anatomical-image patches, as shown in FIG. 2 in process 250.

Additionally, in process 240 as shown in FIG. 2, the anatomical image can be used to improve the similarity weights by using the anatomical image to refine the similarity weights through post processing the similarity weights that were calculated using the noisy image only. The anatomical image can be used to refine the similarity weights and improve the similarity weights by using the additional information provided by the anatomical-image.

On the one hand, when corresponding pairs of noisy-image patches and anatomical-image patches both exhibit a high degree of similarity/correlation (e.g., the similarity weights between the noisy-image patches are large indicating a high degree of similarity between the noisy-image patches and the similarity weights/measure between the anatomical-image patches also indicates a high degree of similarity between the anatomical-image patches), then there is increased confidence that the regions corresponding to the patches are similar. In this case, the corresponding similarity weights calculated using only the noisy-image patches can be increased before applying the similarity weight to the NLM weighted average in accordance with the increased confidence indicated by the similarity between anatomical-image patches. On the other hand, if for a pair of noisy-image patches the similarity weights indicate a high degree of similarity/correlation, and the similarity between corresponding patches of the anatomical image is low, then the similarity weight can be decreased before applying the similarity weight to the NLM weighted average in accordance with the low similarity indicated by the anatomical-image patches.

Thus, using the anatomical images to confirm (increase) or disconfirm (decrease) the similarity weights can improve the accuracy of the weighted average of the NLM filter by providing a second measure between patches and their corresponding regions of the imaged object OBJ. As shown in FIG. 2, in certain implementations, the process 130 uses anatomical images in process 240 to refine the similarity weights. Alternatively, in process 250 mixed similarity weights can be calculated using both the noisy image and the anatomical image.

In certain implementations, the methods described herein can be performed without using anatomical images. For example, anatomical images might not be available in certain implementations. Also, the computational resources used to perform method 100 can be reduced by omitting the steps and processes of method 100 associated with the anatomical images. In implementations not using the anatomical images, process 130 can be simplified by omitting steps 220 and 225 and process 240 and 250 and by substituting process 230 where step 220 used to be.

Returning to those implementations in which anatomical images are used, in step 220, the anatomical images are obtained and rescaled such that the pixel size and pixel locations of the anatomical image correspond to the pixel size and pixel locations of the noisy image. For example, the pixels of the anatomical image can have a one-to-one correspondence with the pixels of the noisy image. This can be performed by using any known interpolation and extrapolation methods, and these methods can be used in the spatial domain. Further, if a time series of noisy images are used, then interpolation and extrapolation can also be used in the temporal domain in addition to interpolating in the spatial domain.

Next, at step 225, the process 130 performs an inquiry whether the anatomical images are to be used for calculating mixed similarity weights or alternatively used to refine similarity weights calculated from the noisy image only. If mixed similarity weights are used then process 130 proceeds from step 225 to process 250. Otherwise, process 130 proceeds from step 225 to process 230. After completing either process 250 or process 240, depending on which branch is selected, process 130 is complete and the resultant similarity weights are returned to the method 100, which performs process 140 by summing pixels corresponding to the patches of the similarity weights using the weighted average of the NLM filter.

In step 140, the similarity weights are used to calculate the NLM-filtered image, in which the pixels NL(u)(i) of the NLM-filtered image are given by $$NL(u)(i) = \sum_{j \in \Omega i} \frac{w(i, j)}{y(i)} u(j),$$

wherein u(j) is the $j^{th}$ pixel value, w(i,j) are the similarity weights between the patches corresponding to the $i^{th}$ and $j^{th}$ pixels respectively, and the normalization factor y(i) is given by summing over all of the similarity weights corresponding to the $i^{th}$ pixel as given by $$y(i) = \sum_{j \in \Omega i} w(i, j).$$

In process 150, the non-NLM-filtered image is blended with the NLM-filtered image. Process 150 is illustrated FIGS. 6A and 6B, which are discussed later herein.

Figure 3:
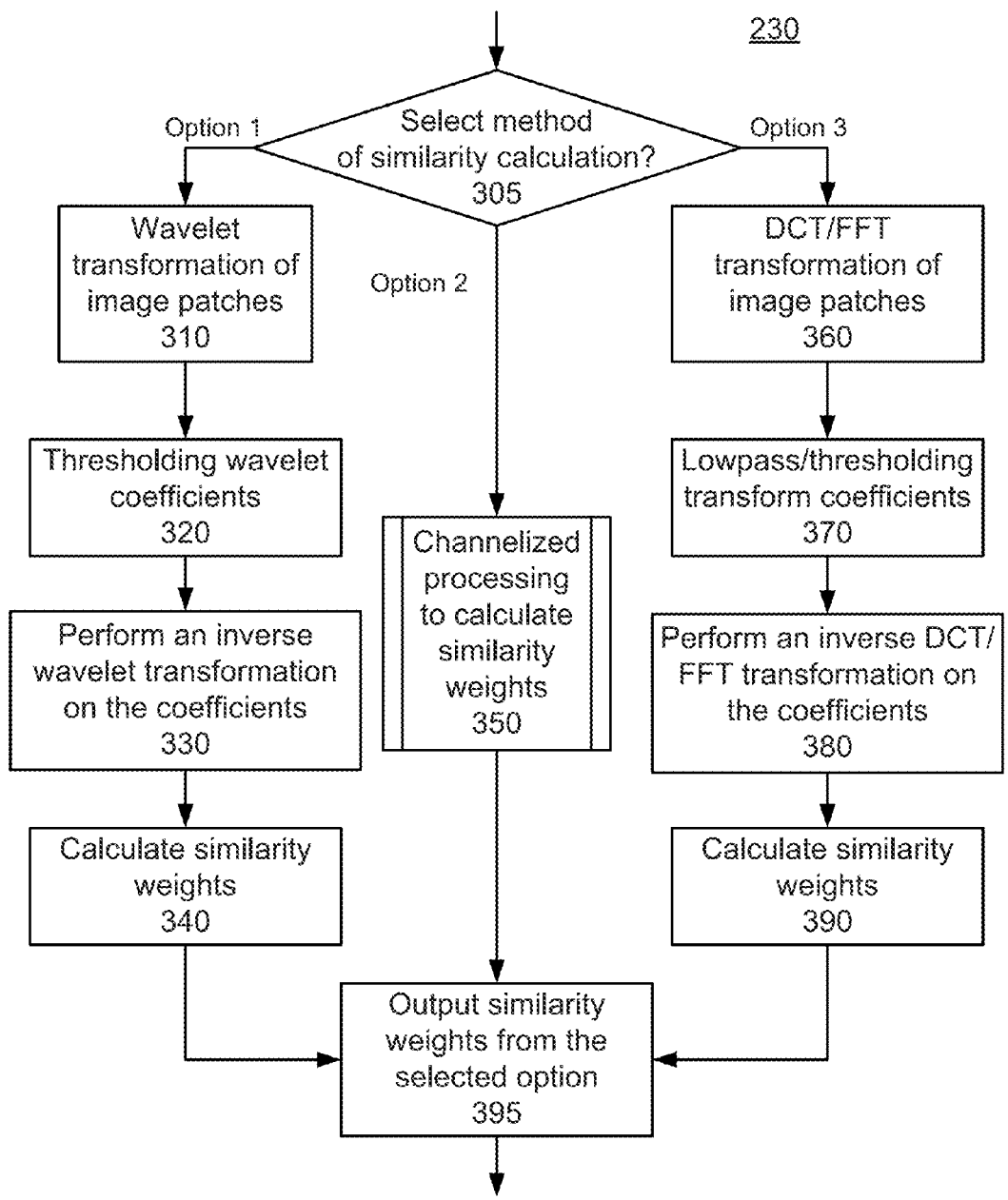
FIG. 3 shows a flow diagram of a process of calculating non-mixed similarity weights for NLM filtering, according to one implementation.

FIG. 3 shows a flow diagram of process 230. In step 305 of process 230, one of three options is selected. In option 1, process 230 proceeds from step 305 to step 310. In option 2, process 230 proceeds from step 305 to process 350. In option 3, process 230 proceeds from step 305 to step 360.

In options 1 and 3, the similarity weights are based on filtered image patches denoted as ũ($\aleph_i$) and ũ($\aleph_j$), rather than being based on the original images patches u($\aleph_i$) and u($\aleph_j$). Thus, in step 340 and in step 390, the similarity weights w(i,j) calculated are calculated after first filtering the noisy image. Basing the similarity weights on filtered patches can provide greater fidelity in the similarity weights between patches by decreasing the contribution of noise to the similarity weight. The similarity weights are calculated as the distance measure between filtered patches ũ($\aleph_i$) and ũ($\aleph_j$), which is given by $$w(i, j) = \exp\left(-\frac{Dist(\tilde{u}(\aleph_i), \tilde{u}(\aleph_j))}{h^2}\right).$$

The filtered patches ũ($\aleph_i$) can be calculated using one of several methods. First, in option 3, the filtered patches ũ($\aleph_i$) can be calculated by transforming the patches to frequency components in the spatial-frequency domain using a fast Fourier transform (FFT), then applying a thresholding method (e.g., frequency components that are less than a predefined threshold are set to zero), and then preforming an inverse fast Fourier transform (IFFT) to convert the thresholded frequency components back into the spatial domain. Second, also in option 3, the filtered patches ũ($\aleph_i$) can be calculated by performing a discrete cosine transform (DCT) to obtain transform coefficients, then applying a thresholding method to the transform coefficients, and then preforming an inverse discrete cosine transform (IDCT) to convert back to the spatial domain. Third, also in option 3, the filtered patches ũ($\aleph_i$) can be calculated by performing a low-pass filter on the transform coefficients. For example, the low-pass filter can be performed by transforming the noisy image into a transform domain, then multiplying the transform coefficients with a transformation of a low-pass filter, and then transforming back to the spatial domain. Alternatively, low-pass filtering can be performed directly in the spatial domain by performing a convolution between the filter and the image. Fourth, in option 1, the filtered patches ũ($\aleph_i$) can be calculated by performing a wavelet transformation of the patches, then applying a thresholding method to set equal to zero those transform coefficients less than a predefined threshold, and then preforming an inverse wavelet transformation to convert the thresholded coefficients back to the spatial domain.

Now, the three options of process 230 are described in more detail with reference being made to the steps and processes illustrated in FIG. 3.

In option 1, the filtered patches ũ($\aleph_i$) are calculated using wavelet transformations and a thresholding method to set to zero wavelet coefficients that are less than a predefined threshold.

In step 310, a wavelet transformation is performed on a pair of image patches. When only one noisy image is being used (i.e., no expanded gate or time series), then the patch u($\aleph_i$) includes pixels of the noisy image from the neighborhood $\aleph_i$, wherein the neighborhood $\aleph_i$ surrounds the pixel u(i). If more than one image is being used for NLM filtering, then the pixels and neighborhoods can be selected from multiple images. In the similarity weights for the noisy image, one of the patches u($\aleph_i$) will be from the noisy image and correspond to the pixel u(i) of the noisy image, and a second patch u($\aleph_j$) will be from any image within the expanded window of step 210, which can include the noisy image.

In step 320, the transform coefficients are modified or filtered. This modification to the transform coefficients can remove noise, for example, to make the similarity weights better indicators of the similarity between pairs of patches, for example. In one implementation, the transform coefficients are modified by thresholding the coefficients and setting to zero the transform coefficients that are below a predefined threshold.

In step 330 the modified transform coefficients are converted back into the spatial domain using an inverse wavelet transformation.

In one implementation, the above steps 310, 320, and 330 can be performed on the entire image rather than on the individual patches. Performing these steps on the image rather than patches can reduce the computational burden imposed by method 100 because the entire image need only be filtered once, whereas filtering patches is performed repeatedly for each pair of patches. After filtering the entire image, the filtered patches can be selected from the filtered image, rather than filtering each patch after it is selected from the noisy image.

In step 340, similarity weights are calculated for each pair of filtered patches ũ($\aleph_i$) and ũ($\aleph_j$). In one implementation the similarity weights are given by $$w(i, j) = \exp\left(-\frac{Dist(\tilde{u}(\aleph_i), \tilde{u}(\aleph_j))}{h^2}\right);$$

however any of the methods described herein can be used and any of the distance measures Dist(a,b) described herein can be used. For example, similarity weights can be calculated using the Euclidean distance measure or using the KL distance measure, as discussed above. After step 340, process 230 proceeds to step 395 where the similarity weights are output to process 240. In process 240, these similarity weights are then used to calculate the NLM-filtered image by performing a weight sum in which the similarity weights are the weights in the sum.

Now, option 3 is described. In option 3, the filtered patches $\tilde{u}(\aleph_i)$ are calculated using either FFT or DCT transformations and performing either thresholding or low-pass filtering on the resultant transform coefficients. Thus, option 3 actual includes four different combinations: (1) an FFT transformation with thresholding, (2) an FFT transformation with low-pass filtering, (3) a DCT transformation with thresholding, and (4) a DCT transformation with low-pass filtering, In step 360, a DCT or FFT transformation is performed on a pair of image patches. When only one image is being used for NLM filtering (i.e., step 210 is skipped), then the patches correspond to neighborhoods around respective pixels of the noisy image. If more than one image is being used for NLM filtering (i.e., step 210 is not skipped), then the pixels and neighborhoods can be from multiple images, although for each the similarity weight at least one pixel and neighborhood of will be from the noisy image.

In step 370, the transform coefficients are modified. This modification to the transform coefficients can remove noise, for example, to make the similarity weights better indicators of the similarity between the pairs of patches. In one implementation, the transform coefficients are modified by thresholding the coefficients setting to zero the transform coefficients that are below a predefined threshold. In one implementation, the transform coefficients are multiplied by a transformation of a low-pass filter. Multiplying in the transform domain can be equivalent to performing a convolution in the spatial domain to perform the low-pass filtering. Either of these modifications to the noisy image (i.e., the thresholding method or the low-pass filtering method) can be used to decrease the effects of noise in the image.

In step 380 the modified transform coefficients are converted back into the spatial domain using the inverse DCT or FFT transformation, depending on whether the original transformation was a DCT or FFT transformation.

In one implementation, the above steps 360, 370, and 380 can be performed on the entire image rather than on the individual patches. Performing these steps on the image rather than patches can reduce the computational burden imposed by process 230 by filtering the image once and then selecting patches from the filtered image, rather than repeatedly filtering each patch after it is selected from the noisy image. Filtering patches will likely result in duplicated effort because for a given similarity weight the patches selected from the image are likely to be identical with or overlap patches of another similarity weight. Thus, in certain implementations, each patch or at least each pixel is likely to be selected and filtered multiple times, if the filtering is performed piecemeal on the patches rather than on the image.

In step 390, similarity weights are calculated for each pair of filtered patches $\tilde{u}(\aleph_i)$ and $\tilde{u}(\aleph_j)$ is calculated. In one implementation, the similarity weights are given by $$w(i,j) = \exp\left(-\frac{Dist(\tilde{u}(\aleph_i), \tilde{u}(\aleph_j))}{h^2}\right);$$

however any of the methods and any of the distance measures Dist(a,b) described herein can be used. For example, similarity weights can be calculated using the Euclidean distance measure or using the KL distance measure, as discussed above. After step 390, process 230 proceeds to step 395 where the similarity weights are output to process 240 where the similarity weights are used to perform the weighted averaging of the NLM filter.

Figure 4A:
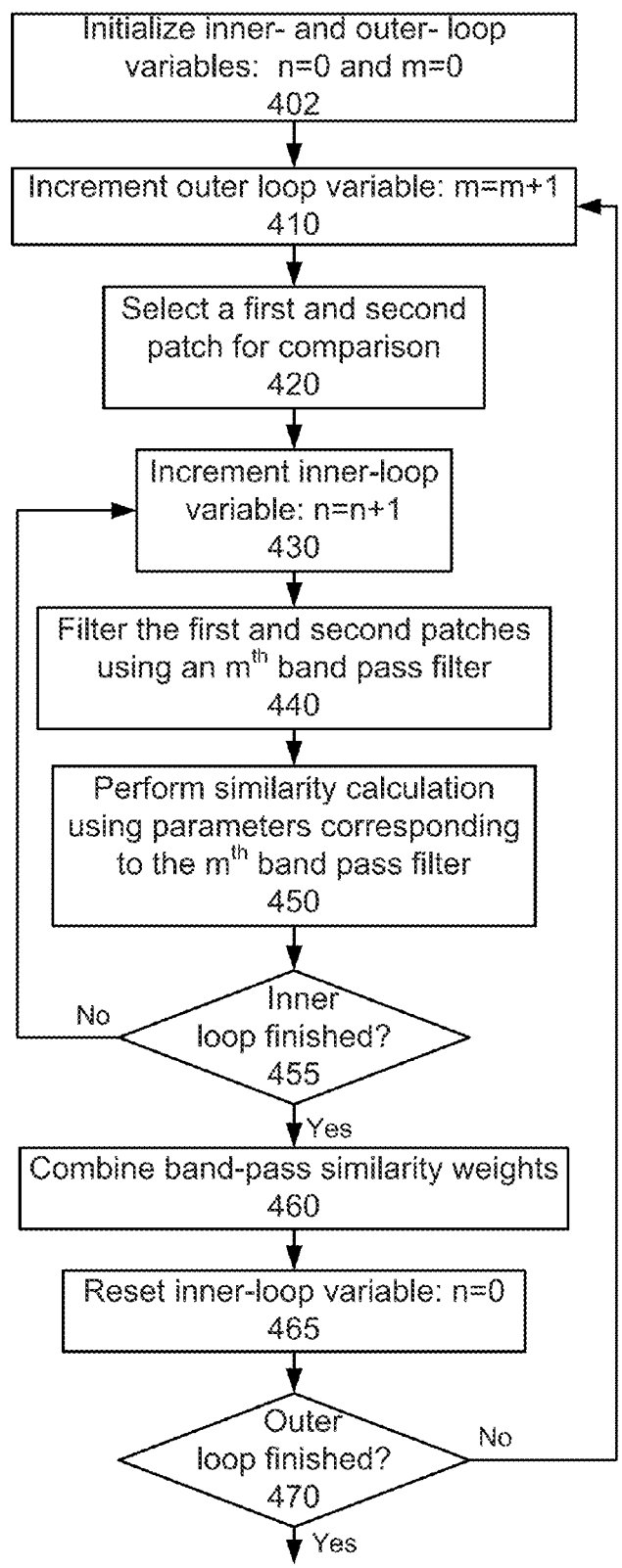
FIG. 4A shows a flow diagram of a process of channelized calculations of similarity weights using band-pass filters, according to one implementation.
Figure 4B:
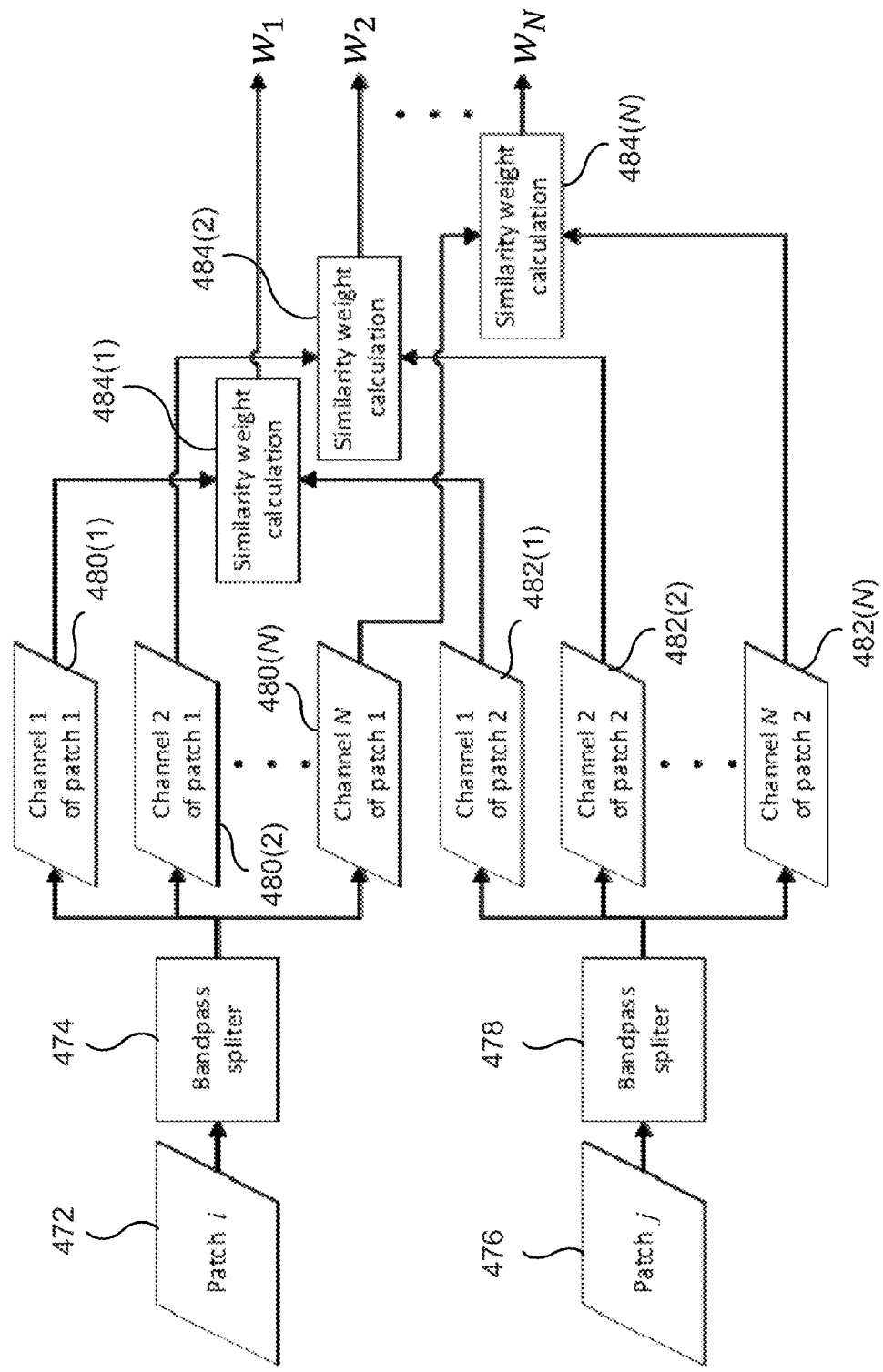
FIG. 4B shows a flow diagram of another implementation of channelized calculations of similarity weights using band-pass filters.

FIG. 4A shows one implementation of process 350, and FIG. 4B shows another implementation of process 350. As shown in FIG. 4A, in the first step 402 of process 350, the inner- and outer-loop variables of process 350 are initialized. The outer-loop variable m counts the number of pairs of patches that have been compared, and the inner-loop variable n tracks the channels and corresponding band-pass filters. In step 440, the patches are filtered into channels using a series of band-passed images with a unique spatial-frequency band for each channel. By considering each channel separately, the parameters used in calculating the similarity weights for that channel can be optimized and tailored to the unique attributes of the channel. For example, different smoothing-strength parameters h can advantageously be used for each channel. Additionally, the channel similarity weights can be rolled up into a total similarity weight for each pair of patches by summing the channel similarity weights using a weighted average. The weighted average increases the contributions of certain channels relative to others, such that channels that are more indicative of the relevant feature size or of the similarity between the patches can be emphasized. For example, the channel weights in the weighted average of channel similarity weights can be determined empirically using test data to determine which channels correlate more strongly with predetermined criteria for the similarity between patches.

In step 410, the outer-loop variable m is incremented.

In step 420, a pair of patches is selected from the noisy image.

In step 430, the inner-loop variable n is incremented. Steps 430, 440, 450, and 455 make up the inner loop, and each iteration of the inner loop calculates the channel similarity weight between the two patches. A total of N similarity weights are calculated corresponding to each of the N channels and band-pass filters.

In step 440, the pair of patches are filtered using the $n^{th}$ band-pass filter to obtain the $n^{th}$ band-pass filtered patches $u(\aleph_i)$ and $u_n(\aleph_j)$ corresponding to the $i^{th}$ and $j^{th}$ patches $\aleph_i$ and $\aleph_j$ respectively.

In step 450, the channel similarity weight $w_n(i,j)$ is calculated between the $n^{th}$ band-pass filtered patches $u(\aleph_i)$ and $u_n(\aleph_j)$ to obtain the $n^{th}$ channel similarity weight, which is given by $$w_n(i,j) = \exp\left(-\frac{Dist(u_n(\aleph_i), u_n(\aleph_j))}{h_n^2}\right).$$

In one implementation, the smoothing-strength parameter $h_n$ can be different for each channel. Herein, channel is used as a short hand designation to refer to the processes of separating the noisy image into frequency components by using a band-pass filter to filter the noisy image (or in certain implementations filtering patches of the noisy image rather than the entire image) and then calculating the channel similarity weight calculations based on the filtered patches.

In step 455, an inquiry is performed whether the inner loop is complete and the similarity weights have been calculated for each channel. If the inner-loop variable n is less than N and all of the channel similarity weights have not been calculated, and the inner loop is not finished. In this case, the process 350 proceeds from step 455 to step 430 in order to repeat the inner loop until all of the channel similarity weights for the current pair of patches have been calculated. Otherwise, the process 350 proceeds from step 455 to step 460.

In step 460, the similarity weight between the pair of patches is calculated as $$w(i,j) = \sum_{n=1}^{N} k_n w_n(i,j),$$

wherein $k_n$ are the weights for the respective channels.

In step 465, the inner-loop variable n is reset to zero.

Step 470 performs an inquiry into whether the outer loop is finished, such that the similarity weights have been calculated for all of the pairs of patches contributing to the weighted average of the NLM filter. If all of the similarity weights have not been calculated then the outer loop is repeated for another pair patches by proceeding from step 470 to step 410. Otherwise process 350 is complete and the outer loop is finished.

In one implementation, the entire image can be band-pass filtered into N band-pass filtered images, rather the band-pass filtering being performed on pair of patches. In this implementation, the patches $u_n(\aleph_i)$ and $u_n(\aleph_j)$ can be selected from the filtered channel images to calculate the channel similarity weights $$w_n(i,j) = \exp\left(-\frac{Dist(u_n(\aleph_i), u_n(\aleph_j))}{h_n^2}\right).$$

The NLM filter is performed by a weighted average of the pixel values u(j) from the noisy image. Thus, in the channelized implementation, the NLM-filtered image is given by $$NL(u)(i) = \sum_{j \in \Omega i} \frac{\sum_{n=1}^{N} k_n w_n(i,j)}{y(i)} u(j),$$

where the normalization factor y(i) is given by $$y(i) = \sum_{j' \in \Omega i} \sum_{n=1}^{N} k_n w_n(i,j).$$

In certain implementations, the smoothing-strength parameter $h_n$ can be different for each channel. Also, the size of the patches $u_n(\aleph_i)$, e.g., the number of pixel rows and pixel columns, can be different for different channels.

In certain implementations, all of the channels use the same size patches, and the smoothing-strength parameter is constant among the channels (i.e., $h_n = h$ for all n). However, the weights $k_n$ can be different for each channel.

In certain implementations, the weights $k_n$ can be different for each channel, but the same patch size and the same values for the smoothing-strength parameters $h_n$ are used for all of the channels.

In other implementations, the patch sizes and the weights $k_n$ can be different for different channels, but the smoothing-strength parameter is constant among the channels (i.e., $h_n = h$ for all n).

In still other implementations, the patch size is constant for all channels, but the smoothing-strength parameters $h_n$ and weights $k_n$ can vary among the channels.

FIG. 4B shows another implementation of the channelized calculation of the similarity weights. Process 350 shows the channelized calculation of the similarity weight for a single pair of patches. This process can be repeated many times, once for each pair of patches to calculate similarity weights for multiple pairs of patches. A first patch corresponding to the subscript i is selected in step 472, and a second patch corresponding to the subscript j is selected in step 476. Then in steps 474 and 478, the first and second patches are separated into a series of channels using the band-pass splitter, such that each channel corresponds to a unique frequency band (e.g., the band-pass splitter can have multiple outputs, wherein each output is a band-pass filtered image corresponding to a respective frequency-band channel). The channelized patches $u_n(\aleph_i)$ corresponding to the first patch are shown in steps 480(1), 480(2) through 480(N), wherein n is the channel number and N is the total number of channels. Similarly, the channelized patches $u_n(\aleph_j)$ corresponding to the second patch are shown in steps 482(1), 482(2) through 482(N). A first similarity weight corresponding to the first channel is calculated in step 484(1), and is given by $$w_1(i,j) = \exp\left(-\frac{Dist(u_1(\aleph_i), u_1(\aleph_j))}{h_1^2}\right).$$

All remaining similarity weights corresponding to the channels 2 through N are calculated in steps 484(2) through 484(N), and these similarity weights are given by $$w_n(i,j) = \exp\left(-\frac{Dist(u_n(\aleph_i), u_n(\aleph_j))}{h_n^2}\right),$$

wherein a unique value for the smoothing-strength parameter $h_n$ can be selected for each channel. The total similarity weight for the channelized patches is then calculated as $$w(i,j) = \sum_{n=1}^{N} k_n w_n(i,j).$$

In certain implementations of calculating the similarity weights in step 340, step 390, or process 350, the similarity weights can be calculated using a patch-dependent smoothing-strength parameter h(i,j) that depends on properties of the respective patches $u(\aleph_i)$ and $u(\aleph_j)$. For example, as discussed above, certain distance measures, such as the Euclidean distance measure, can result in uneven NLM filtering due to the NLM weighted overemphasizing pixels that correspond to patches with a higher average pixel value. To compensate for these uneven contributions to the NLM-filtered image, the smoothing-strength parameter h(i,j) can include a term that balances or counteracts the disproportionately large contributions by pixels corresponding to the high-intensity patches (e.g., high average pixel value patches). In a PET image these high-intensity patches can correspond to sources of high amounts of gamma-rays.

To compensate for this uneven filtering, the smoothing-strength parameter h(i,j) can be adjusted to compensate for patches with higher intensities (e.g., larger average pixel values within the patch). For example, the smoothing-strength parameter h(i,j) can be given by $$h(i,j) = h \cdot k(i,j),$$

wherein h is a constant and k(i,j) is a function of the patch intensities of the of the respective patches u($\aleph_i$) and u($\aleph_j$). The similarity weights with patch dependent smoothing-strength parameter h(i,j), when calculated using the Euclidean distance measure, are given by $$w(i,j) = \exp\left(-\frac{\|u(\aleph_i) - u(\aleph_j)\|_{2,a}^2}{h^2(i,j)}\right),$$

wherein the weighted average of the non-local means filter is given by $$NL(u)(i) = \sum_{j \in \Omega i} \frac{w(i,j)}{y(i)} u(j).$$

Returning to FIG. 2, process 130 provides two ways in which anatomical images can be used to improve the similarity weights. First, mixed similarity weights can be calculated using the anatomical images in process 250. Second, the non-mixed similarity weights calculated in process 230 can be post-processed and refined using the anatomical images in process 240.

Figure 5A:
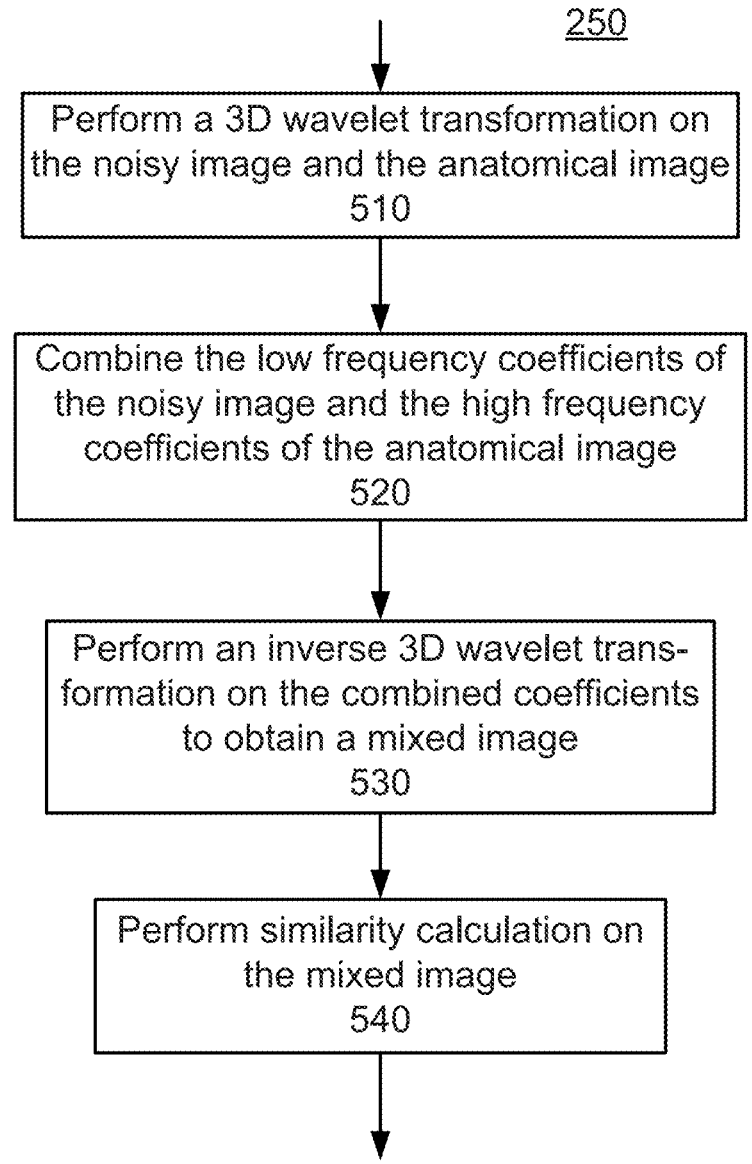
FIG. 5A shows a flow diagram of a process of calculating mixed similarity weights for NLM filtering, according to one implementation.

FIG. 5A shows a flow diagram of one implementation of process 250. In step 510 of process 250, a three-dimensional wavelet transformation is performed on both the noisy image and the anatomical image.

In step 520 of process 250, the low-frequency wavelet coefficients of the noisy image are combined with the high-frequency wavelet coefficients of the anatomical image to generate mixed wavelet coefficients.

In step 530 of process 250, an inverse three-dimensional wavelet transformation is performed on the mixed wavelet coefficients to generate a mixed image.

In step 540 of process 250, mixed similarity weights are calculated using patches from the mixed image. The similarity weight calculations in step 540 are performed using any of the methods described herein, including the similarity weight calculation method of process 230, for example.

Figure 5B:
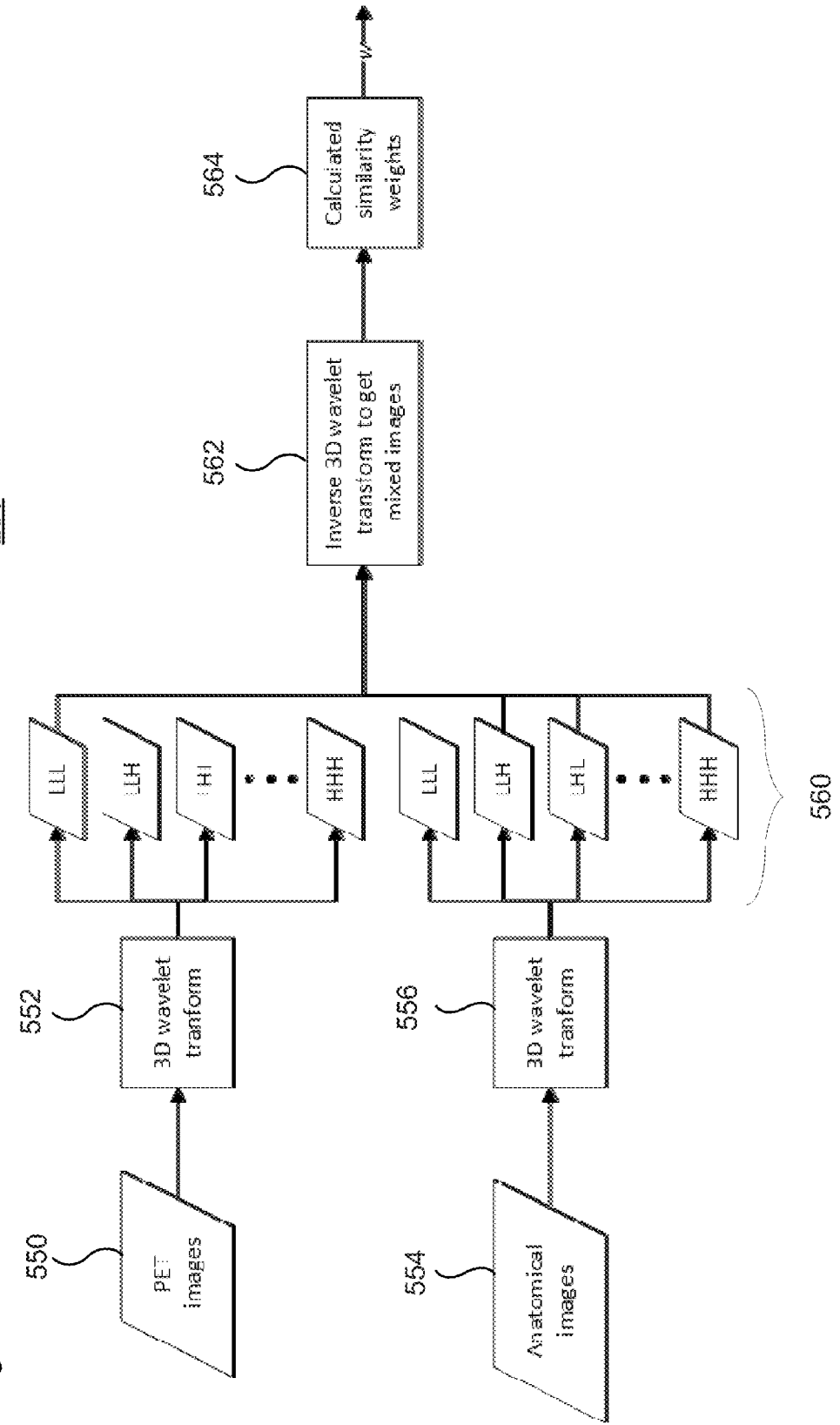
FIG. 5B shows a flow diagram of another process of calculating mixed similarity weights for NLM filtering.

FIG. 5B shows a schematic diagram of another implementation of process 250. In step 550 the noisy image is obtained. In step 554 the anatomical image is obtained. In steps 552 and 556 a three-dimensional wavelet transformation is performed on the noisy image and the anatomical image respectively. The three-dimensional wavelet transformation generates low-frequency and high-frequency wavelet coefficients, and in step 560 the low-frequency wavelet coefficients of the noisy image are combined with the high-frequency wavelet coefficients of the anatomical image. In step 562, an inverse three-dimensional wavelet transformation is performed on the combination of the low-frequency wavelet coefficients of the noisy-image and the high-frequency wavelet coefficients of the anatomical-image, to generate a mixed image. Finally, in step 564, the mixed similarity weights are calculated between patches of the mixed image using the similarity weight calculation methods described herein.

In contrast to the mixed similarity weights, in process 240, the anatomical image can be used to post-process and refine the similarity weights calculated in process 230. For example, in process 240, the similarity weights can be combined with anatomical similarity weights to provide a better measure of the similarity between the object OBJ regions corresponding to patches within the images. For example, when PET is used to generate the noisy image of the object OBJ, another imaging method such as X-ray computed tomography (CT) or magnetic resonance imaging (MRI) can be used to generate a second image of the object OBJ. This second image can be referred to as an anatomical image. For example, a CT image can provide additional information regarding the similarity between various patches also represented in the PET image. Thus, the anatomical image can confirm or disconfirm the degree of similarity original estimated by the similarity weights calculated in process 230. When the similarity weights from the noisy image and the similarity weights from the anatomical image both confirm that the regions of the object OBJ are similar, then there is a higher confidence that the corresponding patches in the noisy image are indeed similar, and the similarity weight for these two patches can be larger than if the corresponding similarity weight from the anatomical image did not indicate the regions were similar.

Accordingly, the refined similarity weights corresponding to a given pair of patch regions will be (i) largest when both the anatomical-image similarity weight and the noisy-image similarity weight are large, (ii) smaller when only one of the anatomical-image similarity weights and the noisy-image similarity weights is large, and (iii) smallest when both the anatomical-image similarity weights and the noisy-image similarity weights are small. Stated differently, when the anatomical-image similarity weight confirms the similarity of a pair of noisy-image patches, then the corresponding similarity weight calculated in process 230 is increased. On the other hand, when the anatomical image indicates that two patches are not similar, then the corresponding similarity weight calculated in process 230 is decreased. Refined similarity weights result from this process of adjusting the similarity weight calculated in process 230 up or down according to the corresponding anatomical-image similarity weight.

Figure 6A:
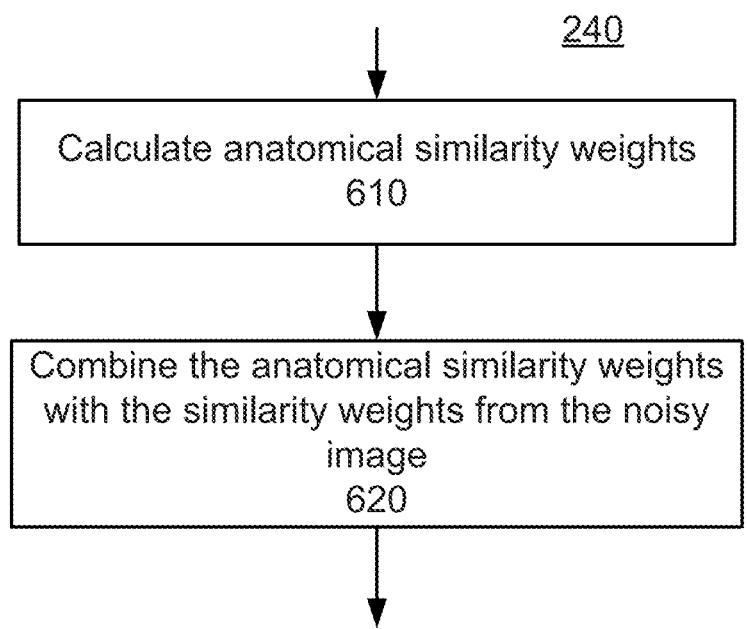
FIG. 6A shows a flow diagram of a process for using anatomical images to refine the similarity weights, according to one implementation.

FIG. 6A shows one implementation of process 240. In FIG. 6A, the refined similarity weights used in the weighted sum of the NLM filter are calculated according to $$w(i,j) = w_{pet}(i,j) w_a(i,j)$$

wherein $w_a(i,j)$ are the anatomical similarity weights calculated using patches of the anatomical image only, and $w_{pet}(i,j)$ are the similarity weights of the noisy image calculated using patches of the noisy image. The similarity weights $w_{pet}(i,j)$ can be determined using any variation of the methods described herein. For example, these similarity weights $w_{pet}(i,j)$ can be calculated in process 230 using any of the methods discussed for process 230.

In step 610 of process 240, the anatomical similarity weights $w_a(i,j)$ can also be determined using any variation of the methods described herein for calculating similarity weights for the noisy image.

In step 620 of process 240, the anatomical similarity weights $w_a(i,j)$ are combined with the noisy-image similarity weights $w_{pet}(i,j)$. For example, the anatomical similarity weights $w_a(i,j)$ can be combined with the noisy-image similarity weights $w_{pet}(i,j)$ by multiplying them pixel-by-pixel to obtain the total similarity weights, which is given by the expression $$w(i,j) = w_{pet}(i,j) w_a(i,j).$$

Figure 6B:
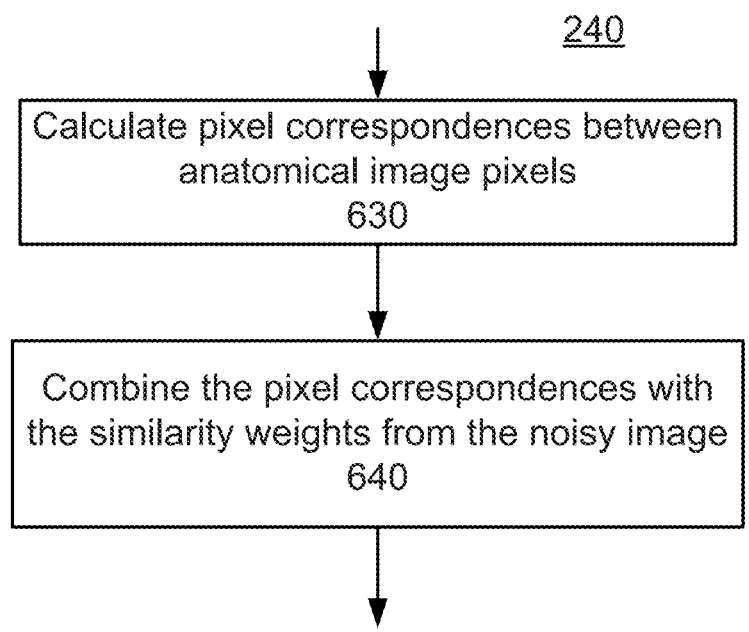
FIG. 6B shows a flow diagram of another process for using anatomical images to refine the similarity weights.

FIG. 6B shows another implementation of process 240. In FIG. 6B, the process 240 includes classifying the anatomical image into regions. For example, the regions of the anatomical image can include (i) a bone region, (ii) a soft-tissue region (e.g., liver, muscle, kidney, and blood), (iii) a water region, and (iv) a lung tissue and air region. Regions need not be continuous. For example, two separate bones can both belong to the bone region, and two separate and distinct soft-tissue organs can both belong to the soft-tissue region. This can be achieved, for example, by a thresholding method and region growing method or simply by a thresholding method in which the regions are classified according to intensity or absorption density (e.g., absorption density can be used with reconstructed images from an energy integrating CT scanner, wherein the highest absorption density regions correspond to bone regions, lower density absorption pixels correspond to soft-tissue regions, etc.). Also, in dual-energy CT or CT using photon counting and/or X-ray energy resolving detectors, regions can be defined according to spectral absorption criteria, for example. In FIG. 6B, the similarity between pixels of the anatomical images can be based on whether the pixels are of the same region type, for example.

The partitioning the anatomical image into regions can benefit from the fact that some types of anatomical images (e.g., dual energy CT and MRI) can convey more information than a mere density distributions, and this additional information can improve differentiation between tissue types (e.g., bone and soft tissues like liver, muscle, kidney, blood, water, and lung). On the other hand, even without recourse to dual-energy detection, CT images can be classified into regions according to their attenuation density (e.g., the most dense absorption regions can be classified as bone; then a second classification can be made for soft tissue like liver, muscle, kidney, and blood; water can be classified into a third category corresponding to lower attenuation density than the soft tissues; and then lung and air can be classified into a fourth category corresponding to regions of the lowest absorption density).

In step 630 shown in FIG. 6B, when the anatomical image has been classified into regions, two pixels can be determined to be similar based on which regions they belong to. For example, in certain implementations, pixels corresponding to the same region are determined to be similar (e.g., $w_a(i,j)=1$ when the pixel i and the pixel j are in the same region). In contrast, two pixels can be determined to be dissimilar if the pixels correspond to different regions (e.g., $w_a(i,j)=0$ when the pixels i and j belong to different regions). Thus, the correspondence/similarity between pixels of the anatomical image is given by $$\mathbb{1}(i,j) = \begin{cases} 1 & i \text{ and } j \text{ belong to the same region} \\ 0 & i \text{ and } j \text{ belong to the different regions} \end{cases},$$

wherein $\mathbb{1}(i,j)$ is referred to as the correspondence between the pixel i and the pixel j of the anatomical image In step 640 shown in FIG. 6B, the anatomical pixel correspondence $\mathbb{1}(i,j)$ is combined with the noisy-image similarity weights $w_{pet}(i,j)$. For example, the pixel correspondences $\mathbb{1}(i,j)$ and the similarity weights $w_{pet}(i,j)$ can be combined by multiplying, and the resultant final similarity weights are given by $$w(i,j) = w_{pet}(i,j) \mathbb{1}(i,j).$$

Having completed process 130 and obtained the final similarity weights, method 100 continues to step 140 shown in FIG. 1. In step 140 the weighted average of the NLM filter is performed according to $$NL(u)(i) = \sum_{j \in \Omega i} \frac{w(i,j)}{y(i)} u(j).$$

Figure 7A:
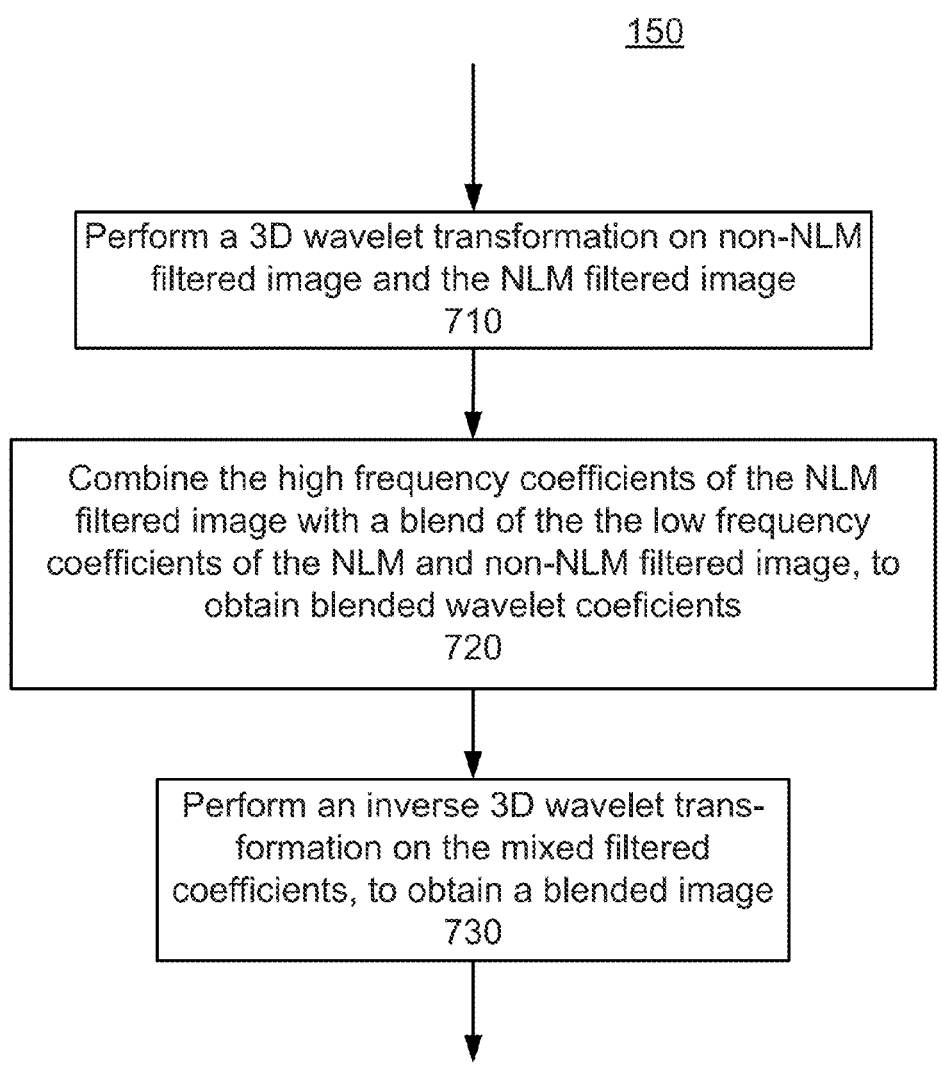
FIG. 7A shows a flow diagram of a process for blending a local-filtered image with a NLM-filtered image, according to one implementation.

Next in process 150, the NLM-filtered image NL(u) can be combined with the image filtered using the first filter method (i.e., a non-NLM filter method). FIG. 7A shows a flow diagram of one implementation of process 150.

In step 710 of process 150, the NLM-filtered image from step 140 is transformed using a three-dimensional wavelet transformation, and the non-NLM-filtered image from step 120 is transformed using a three-dimensional wavelet transformation.

In step 710 of process 150, the high-frequency wavelet coefficients of the NLM-filtered image are combined with a blending between the low-frequency wavelet coefficients of the non-NLM-filtered image and the low-frequency wavelet coefficients of the NLM-filtered image, to generate combined wavelet coefficients. For example, the low-frequency wavelet coefficients can be blended by normalizing the respective NLM and non-NLM wavelet coefficients and calculating the pairwise algebraic mean between the NLM low-frequency wavelet coefficients of the non-NLM low-frequency wavelet coefficients. Alternatively, the low-frequency wavelet coefficients can be blended using the pairwise geometric mean, rather than the algebraic mean.

In step 710 of process 150, the blended wavelet coefficients are transformed into a blended image by performing an inverse three-dimensional wavelet transformation on the blended wavelet coefficients.

Figure 7B:
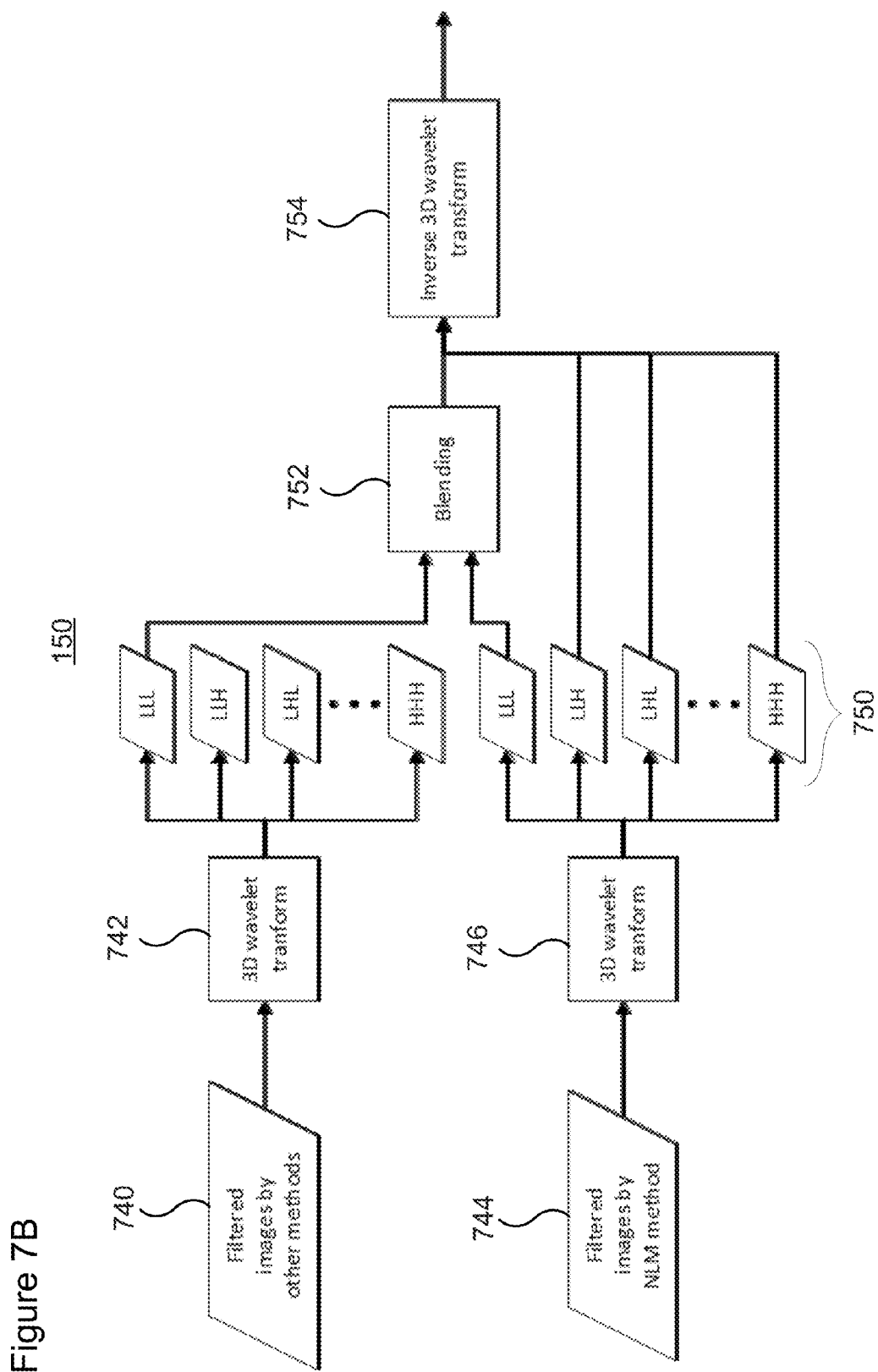
FIG. 7B shows a flow diagram of another process for blending a local-filtered image with a NLM-filtered image.

FIG. 7B shows one implementation of process 150. The non-NLM-filtered image and the NLM-filtered image are obtained respectively in steps 740 and 744. In steps 742 and 746, the three-dimensional wavelet transformation is performed on the non-NLM and NLM-filtered images respectively. In step 750, the low-frequency wavelet coefficients from the NLM and low-frequency wavelet coefficients from non-NLM filter images are selected to be blended together in step 752. Also in step 750, the high-frequency wavelet coefficients from the NLM filter image are selected to be combined with the blended low-frequency wavelet coefficients before performing the inverse three-dimensional wavelet transformation in step 754 to generate a blended image from the combination of the blended low-frequency wavelet coefficients and the high-frequency NLM-filtered wavelet coefficients. In step 572, the low-frequency wavelet coefficients can be blended using one of the blending methods discussed for step 720 shown in FIG. 7A. In step 754, the combination of the blended low-frequency wavelet coefficients with the high-frequency NLM-filtered wavelet coefficients is transformed using the inverse three-dimensional wavelet transformation, to generate a blended image.

In addition to the methods described above, the noisy image can also be filtered using a NLM filtering method that omits various of the steps and processes described above, as would be understood by one of ordinary skill in the art. For example, step 120 and process 150 can be omitted in certain implementations. Further, in certain implementations, process 250, processes 230 and 240, or process 250 and 240 can be omitted from process 130. In certain implementations, steps 205 and 210 can be omitted from process 130. In process 230, any one or two of the three options can be omitted, according to certain implementations of process 230. Additionally, multiple variations of process 350, 250, 240, and 150 can be implemented in various combinations and permutations, as indicated in FIGS. 4A, 4B, 5A, 5B, 6A, 6B, 7A, and 7B, for example.

Several improvements can be realized by using the methods described herein. For example, the methods described herein can advantageously achieve more robust filtering of noisy image by performing filtering of the noisy image in a transform domain. Further, the similarity weights can be improved using channelized similarity weight calculations with the parameters of the calculation (e.g., the smoothing-strength parameter h) individually optimized to the respective channels. When the noisy image includes a time series of images, the time window of the NLM filtering method can be expanded to include patches from time-adjacent images in the time series as illustrated in step 210 of FIG. 2. In implementations that use the KL distance measure, the robustness of the NLM filtering is improved by more evenly weighting the contributions from low-intensity patches and high-intensity patches. Additionally, implementations that use a patch-adaptive smoothing-strength parameter h(i,j) also benefit from more robust NLM filtering due to a more evenly weighting of the contributions from both low-intensity patches and high-intensity patches. Moreover, the image quality of the blended images can be adapted to various clinical applications by combining/blending the NLM-filtered image with other filtered images, such as blending a non-NLM-filtered image with an NLM-filtered image. Through the choice of the type of filter used for the non-NLM-filtered image, the blended image can be tailored to target certain clinical objectives. Moreover, using anatomical images to refine or originate the similarity weights can result in better body/organ contour definition and better overall image quality.

Figure 8A:
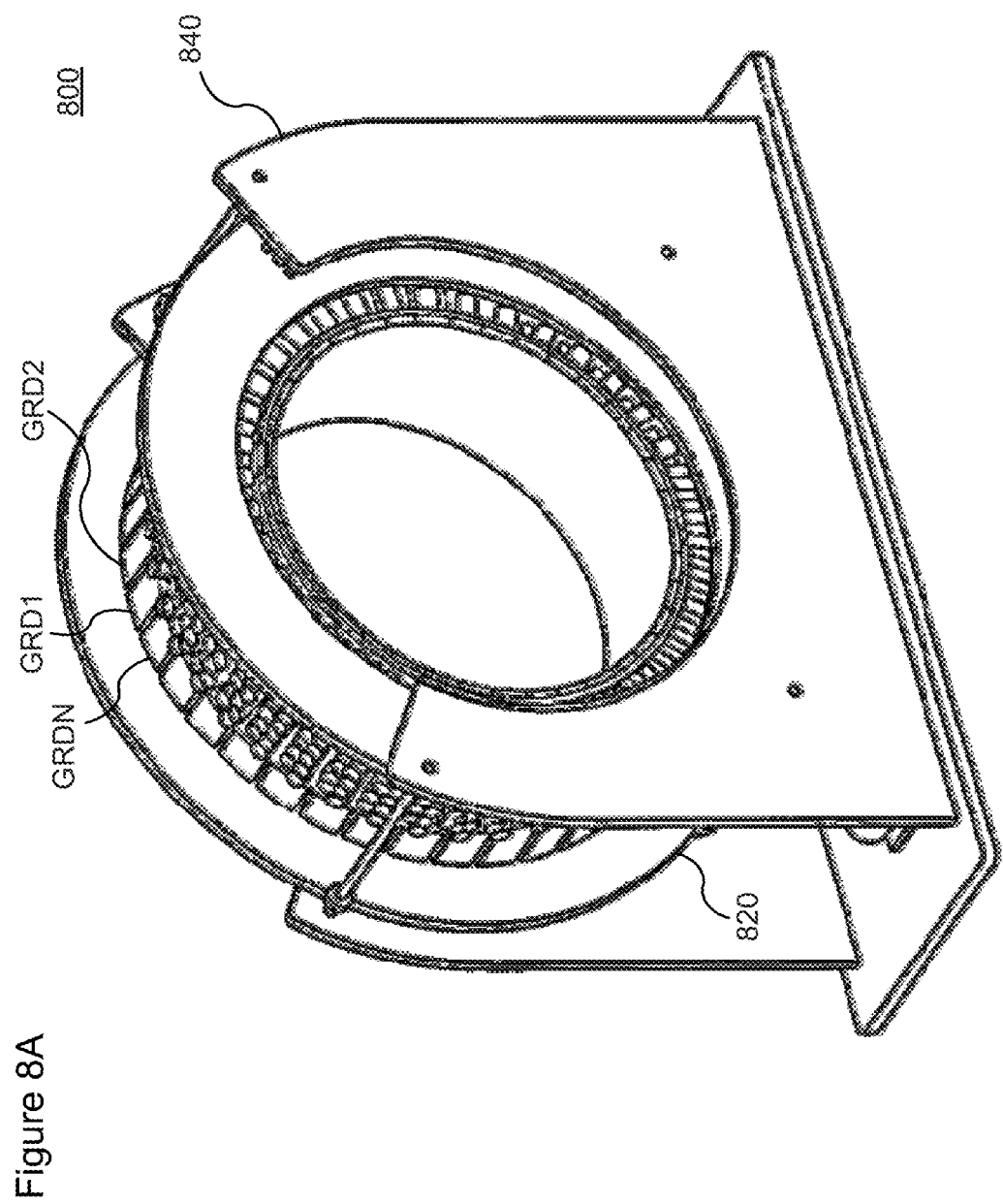
FIG. 8A shows a perspective view of a positron-emission tomography (PET) scanner, according to one implementation.
Figure 8B:
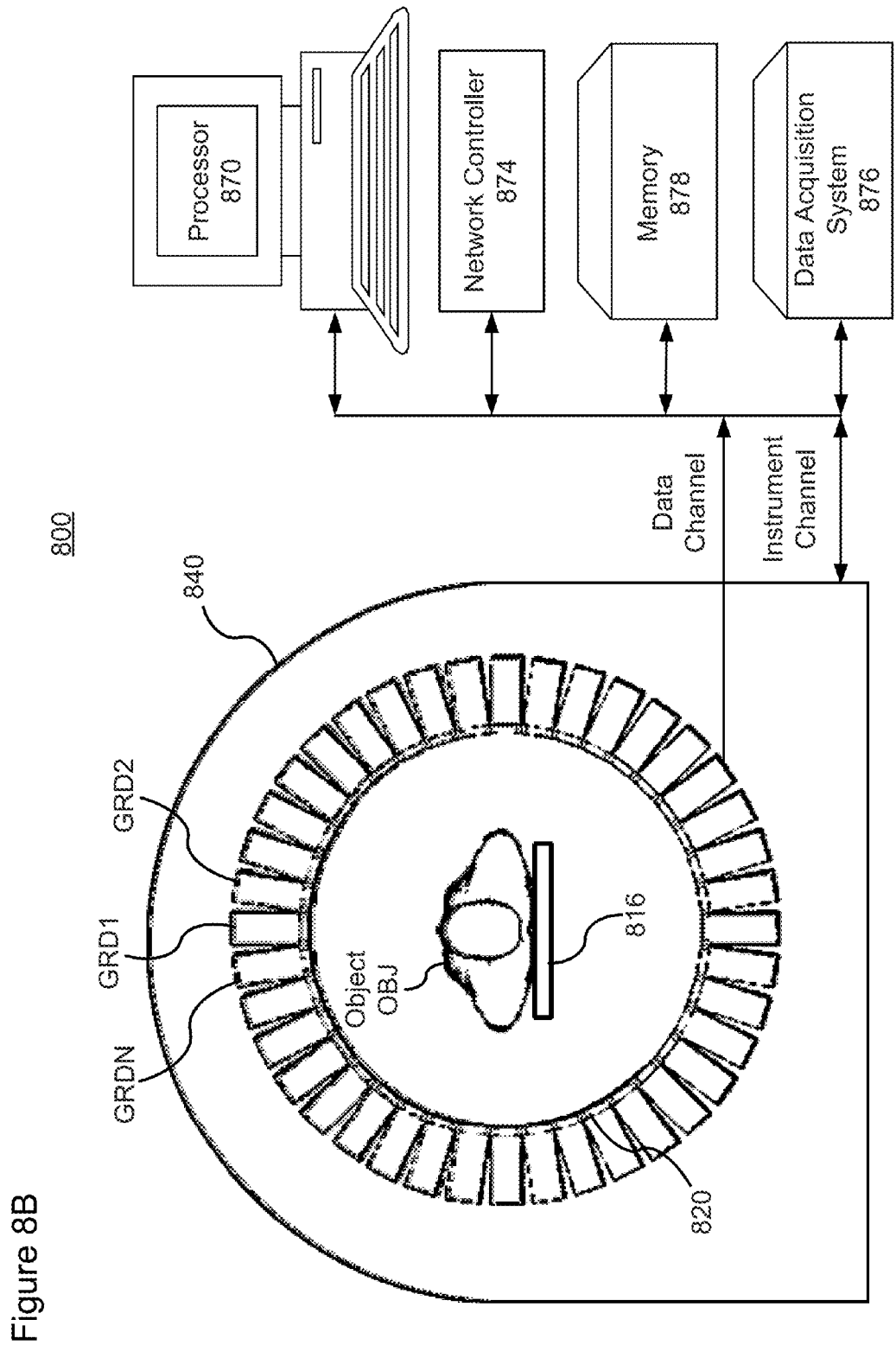
FIG. 8B shows a schematic view of the PET scanner, according to one implementation.

FIGS. 8A and 8B show a PET scanner 800 including a number of GRDs (e.g., GRD1, GRD2, through GRDN) that are each configured as rectangular detector modules. According to one implementation, the detector ring includes 40 GRDs. In another implementation, there are 48 GRDs, and the higher number of GRDs is used to create a larger bore size for the PET scanner 800.

Each GRD can include a two-dimensional array of individual detector crystals, which absorb gamma radiation and emit scintillation photons. The scintillation photons can be detected by a two-dimensional array of photomultiplier tubes (PMTs) that are also arranged in the GRD. A light guide can be disposed between the array of detector crystals and the PMTs. Further, each GRD can include a number of PMTs of various sizes, each of which is arranged to receive scintillation photons from a plurality of detector crystals. Each PMT can produce an analog signal that indicates when scintillation events occur, and an energy of the gamma ray producing the detection event. Moreover, the photons emitted from one detector crystal can be detected by more than one PMT, and, based on the analog signal produced at each PMT, the detector crystal corresponding to the detection event can be determined using Anger logic and crystal decoding, for example.

FIG. 8B shows a schematic view of a PET scanner system having gamma-ray (gamma-ray) photon counting detectors (GRDs) arranged to detect gamma-rays emitted from an object OBJ. The GRDs can measure the timing, position, and energy corresponding to each gamma-ray detection. In one implementation, the gamma-ray detectors are arranged in a ring, as shown in FIGS. 8A and 8B. The detector crystals can be scintillator crystals, which have individual scintillator elements arranged in a two-dimensional array and the scintillator elements can be any known scintillating material. The PMTs can be arranged such that light from each scintillator element is detected by multiple PMTs to enable Anger arithmetic and crystal decoding of scintillation event.

FIG. 8B shows an example of the arrangement of the PET scanner 800, in which the object OBJ to be imaged rests on a table 816 and the GRD modules GRD1 through GRDN are arranged circumferentially around the object OBJ and the table 816. The GRDs can be fixedly connected to a circular component 820 that is fixedly connected to the gantry 840. The gantry 840 houses many parts of the PET imager. The gantry 840 of the PET imager also includes an open aperture through which the object OBJ and the table 816 can pass, and gamma-rays emitted in opposite directions from the object OBJ due to an annihilation event can be detected by the GRDs and timing and energy information can be used to determine coincidences for gamma-ray pairs.

In FIG. 8B, circuitry and hardware is also shown for acquiring, storing, processing, and distributing gamma-ray detection data. The circuitry and hardware include: a processor 870, a network controller 874, a memory 878, and a data acquisition system (DAS) 876. The PET imager also includes a data channel that routes detection measurement results from the GRDs to the DAS 876, a processor 870, a memory 878, and a network controller 874. The data acquisition system 876 can control the acquisition, digitization, and routing of the detection data from the detectors. In one implementation, the DAS 876 controls the movement of the bed 816. The processor 870 performs functions including reconstructing images from the detection data, pre-reconstruction processing of the detection data, and post-reconstruction processing of the image data, as discussed herein.

The processor 870 can be configured to perform functions of the NLM filter methods and processes described herein, such as method 100, for example. The processor 870 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

Alternatively, the CPU in the processor 870 can execute a computer program including a set of computer-readable instructions that perform the functions of the NLM filtering methods described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the NLM-filtered image can be displayed on a display. The display can be an LCD display, CRT display, plasma display, OLED, LED or any other display known in the art.

The memory 878 can be a hard disk drive, CD-ROM drive, DVD drive, FLASH drive, RAM, ROM or any other electronic storage known in the art.

The network controller 874, such as an Intel Ethernet PRO network interface card from Intel Corporation of America, can interface between the various parts of the PET imager. Additionally, the network controller 874 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus for processing images, comprising:
    circuitry configured to
        receive a first noisy image representing an object; and
        filter the first noisy image using a first filter to generate a first filtered image;
        partition the first filtered image into patches,
        calculate first similarity values between pairs of the patches of the first filtered image,
        calculate non-local means (NLM) weights using the first similarity values, and
        determine pixels of a NLM image by performing a weighted average, using the NLM weights, of pixels of the first noisy image.

2. The apparatus according to claim 1, wherein the first filter is a low-pass filter.

3. The apparatus according to claim 1, wherein the circuitry is further configured to
    calculate the respective first similarity values as a function of a distance measure between the respective pairs of the patches, and
    the distance measure is one of a Euclidean distance measure and a Kulback-Leibler distance measure.

4. The apparatus according to claim 1, wherein the circuitry is further configured to filter the first noisy image by
    transforming the first noisy image from a spatial domain to a transform domain to generate transform-domain coefficients,
    setting the respective transform-domain coefficients to zero, when the respective transform-domain coefficients are less than a predefined threshold, to generate thresholded coefficients, and
    transforming the thresholded coefficients from the transform domain to the spatial domain, to generate the first filtered image.

5. The apparatus according to claim 4, wherein the transforming of the first noisy image is performed using at least one of a fast Fourier transformation and a discrete cosine transformation.

6. The apparatus according to claim 1, wherein the circuitry is further configured to filter the first noisy image by
    transforming, using a wavelet transformation, the first noisy image from a spatial domain to a transform domain, to generate transform-domain coefficients corresponding to a plurality of wavelet bands,
    setting respective coefficients of a wavelet band to zero when the respective coefficients of the band are less than a respective threshold corresponding to the wavelet band, to generate thresholded coefficients, and
    transforming, using an inverse wavelet transformation, the thresholded coefficients from the transform domain to the spatial domains, to generate the first filtered image.

7. The apparatus according to claim 1, wherein the circuitry is further configured to
    filter the first noisy image into frequency-band channels using a plurality of band-pass filters, to generate a plurality of filtered images, each filtered image of the plurality of filtered images corresponding to a respective frequency-band channel and a respective a band-pass filter of the a plurality of band-pass filters,
    partition, for each respective frequency-band channel, the corresponding filtered image of the plurality of filtered images into patches,
    calculate, for each respective frequency-band channel, channelized similarity values between respective pairs of patches of the corresponding filtered image of the plurality of filtered images, and
    calculate the respective NLM weight of each pair of patches by performing a weighted summation, using channel weights, of the respective channelized similarity values corresponding to each respective pair of patches, wherein
    the first filter is one of the plurality of band-pass filters,
    the first filtered image is one of the plurality of filtered images, and
    the first similarity values are the channelized similarity values corresponding to the frequency-band channel of the first filtered image.

8. The apparatus according to claim 7, wherein the circuitry is further configured to
    calculate, for each respective frequency-band channel, the channelized similarity values between the respective pairs of patches of the corresponding filtered image of the plurality of filtered images by
    calculating a function of a respective ratio between a distance measure between the respective pairs of the patches of the corresponding filtered image and a respective channel smoothing-strength parameter corresponding to the respective frequency-band channel.

9. The apparatus according to claim 1, wherein
    the circuitry is further configured to
        receive a plurality of noisy images representing the object,
        filter the plurality of noisy images using the first filter, to generate a plurality of filtered images;
        partition the plurality of filtered images into the patches, calculate a plurality of similarity values between pairs of the patches of the plurality of noisy images, calculate the NLM weights using the plurality of similarity values, and determine pixels of the NLM i age by performing the weighted average, using the NLM weights, of pixels of the plurality of noisy images, wherein the plurality of noisy images includes the first noisy image, the plurality of filtered images includes the first filtered image, and the plurality of similarity values includes the first similarity values.

10. The apparatus according to claim 1, wherein calculating the first similarity values is performed by calculating a function of a ratio between a distance measure between the pairs of the patches of the first noisy image and a smoothing-strength parameter, and each smoothing-strength parameter is a function of pixel values of the respective pair of the patches of the first noisy image.

11. The apparatus according to claim 1, wherein the circuitry is further configured to receive an anatomical image representing the object, partition the anatomical image into patches, calculate second similarities values between pairs of the patches of the anatomical image, and calculate the NLM weights by multiplying the first similarity values with the second similarity values.

12. The apparatus according to claim 11, wherein the circuitry is further configured to receive an anatomical image representing the object, categorize pixels of the anatomical image into regions, calculate the second similarity values between pairs of the patches of the anatomical image by setting the respective second similarity value of a corresponding pair of patches to a predefined high value when a predefined pixel of a first patch of the corresponding pair of patches is categorized into the same region as a predefined pixel of a second patch value of the corresponding pair of patches, and setting the respective second similarity value of the corresponding pair of patches to a predefined low value when the predefined pixel of the first patch of the corresponding pair of patches is not categorized into the same region as the predefined pixel of the second patch value of the corresponding pair of patches.

13. The apparatus according to claim 11, wherein the circuitry is further configured to calculate the second similarity values by calculating a function of a distance measure between the respective pairs of the patches, and the distance measure is one of a Euclidean distance measure and a Kulback-Leibler distance measure.

14. The apparatus according to claim 1, wherein the circuitry is further configured to filter the first noisy image using a local filter, to generate a local-filtered image, transform, using a wavelet transformation, the local-filtered image to a transform domain, to generate low-frequency wavelet coefficients of the local-filtered image and high-frequency wavelet coefficients of the local filtered image, transform, using the wavelet transformation, the NLM image to the transform domain, to generate low-frequency wavelet coefficients of the NLM image and high-frequency wavelet coefficients of the NLM image, blend the low-frequency wavelet coefficients of the local-filtered image with the low-frequency wavelet coefficients of the NLM image, to generate blended wavelet coefficients, combine the high-frequency wavelet coefficients of the NLM image with the blended wavelet coefficients, to generate combined coefficients, and transform the combined coefficients, using the inverse wavelet transformation, to generate a combined image, wherein the local filter is one of a local-linear filter, a local-nonlinear filter, and a regularization filter.

15. The apparatus according to claim 14, wherein the circuitry is further configured to blend the low-frequency wavelet coefficients of the local-filtered image with the low-frequency wavelet coefficients of the NLM image by one of (i) pairwise calculating an algebraic mean between respective low-frequency wavelet coefficients of the local-filtered image and corresponding low-frequency wavelet coefficients of the NLM image, and (ii) pairwise calculating an geometric mean between the respective low-frequency wavelet coefficients of the local-filtered image and the corresponding low-frequency wavelet coefficients of the NLM image.

16. An apparatus for processing images, comprising:
circuitry configured to receive a first noisy image representing an object and an anatomical image representing the object, combine the first noisy image and the anatomical image, to generate a first mixed image, partition the first mixed image into patches, calculate first similarity values between pairs of the patches of the first mixed image, calculate non-local means (NLM) weights using the first similarity values, and determine pixels of a NLM image by performing a weighted average, using the NLM weights, of pixels of the first noisy image.

17. The apparatus according to claim 16, wherein the circuitry is further configured to combine the first noisy image and the anatomical image by transforming, using a wavelet transformation, the first noisy image into a transform domain, to generate low-frequency wavelet coefficients of the first noisy image and high-frequency wavelet coefficients of the first noisy image, transforming, using the wavelet transformation, the anatomical image into the transform domain, to generate low-frequency wavelet coefficients of the anatomical image and high-frequency wavelet coefficients of the anatomical image, combining the high-frequency wavelet coefficients of the anatomical image with the low frequency wavelet coefficients of the first noisy image, to generate combined coefficients, transforming, using an inverse wavelet transformation, the combined coefficients into the spatial domain, to generate the first mixed image.

18. The apparatus according to claim 16, wherein the circuitry is further configured to receive a plurality of noisy images representing the object and a plurality of anatomical images representing the object, combine respective noisy images of the plurality of noisy images with respective anatomical images of the plurality of anatomical images, to generate a plurality of mixed images, partition the plurality of mixed images into patches, calculate first similarity values between pairs of the patches of the mixed images into patches, calculate non-local means (NLM) weights using the first similarity values, and determine pixels of a NLM image by performing a weighted average, using the NLM weights, of pixels of the plurality of noisy image, wherein the first noisy image is one of the plurality of noisy image, the first anatomical image is one of the plurality of anatomical image, and the first mixed image is one of the plurality of mixed image.

19. A positron emission tomography (PET) apparatus, comprising:

a plurality of detector elements configured to detect radiation emitted from an object, and generate detection data representing a respective time and a respective position of radiation detection events;

circuitry configured to reconstruct, using the detection data, a first reconstructed image representing the object;

filter the first reconstructed image using a first filter, to generate a first filtered image;

partition the first filtered image into patches, calculate first similarity values between pairs of the patches of the first filtered image, calculate non-local means (NLM) weights using the first similarity values, and determine pixels of a NLM image by performing a weighted average, using the NLM weights, of pixels of the first reconstructed image.

20. The apparatus according to claim 19, wherein the circuitry is further configured to receive an anatomical image representing the object, partition the anatomical image into patches, calculate second similarities values between pairs of the patches of the anatomical image, and calculate the NLM weights by multiplying the first similarity values with the second similarity values.

* * * * *